United States Patent
Kishigami

(10) Patent No.: US 9,054,763 B2
(45) Date of Patent: Jun. 9, 2015

(54) WIRELESS COMMUNICATION DEVICE AND WIRELESS COMMUNICATION METHOD

(75) Inventor: Takaaki Kishigami, Tokyo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 13/386,605

(22) PCT Filed: Jul. 8, 2010

(86) PCT No.: PCT/JP2010/004459
§ 371 (c)(1),
(2), (4) Date: Jan. 23, 2012

(87) PCT Pub. No.: WO2011/010433
PCT Pub. Date: Jan. 27, 2011

(65) Prior Publication Data
US 2012/0120907 A1    May 17, 2012

(30) Foreign Application Priority Data

Jul. 24, 2009    (JP) .................................. 2009-173369

(51) Int. Cl.
*H04W 4/00* (2009.01)
*H04J 3/00* (2006.01)
(Continued)

(52) U.S. Cl.
CPC .......... *H04B 7/0697* (2013.01); *H04B 17/0077* (2013.01); *H04L 5/0023* (2013.01);
(Continued)

(58) Field of Classification Search
CPC .................................................. H04W 28/04
USPC .................................................. 370/329, 280
See application file for complete search history.

(56) References Cited

U.S. PATENT DOCUMENTS 6,529,709 B1 *   3/2003   Shen et al. ...................... 455/69
2006/0203794 A1   9/2006   Sampath et al.
(Continued)

FOREIGN PATENT DOCUMENTS

JP    2007-151059 A    6/2007
JP    2009164751 A    7/2009
(Continued)

OTHER PUBLICATIONS

IEEE WirelessMAN 802.16, "Part 16: Air Interface for Fixed and Mobile Broadband Wireless Access Systems," Advanced Air Interface (working document), 802.16m-09/0010r1a (working document), Mar. 2008, 351 pages.
(Continued)

*Primary Examiner* — Omar Ghowrwal
*Assistant Examiner* — Angel Brockman
(74) *Attorney, Agent, or Firm* — Seed IP Law Group PLLC

(57) ABSTRACT

A bias of reception qualities between spatial streams to a plurality of terminal devices is suppressed in a multiuser MIMO transmission. A wireless communication device according to the invention is one for performing a spatial multiplexing transmission to the plurality of terminal devices, that includes an additional data area setting section that allocates, as an additional data area, a part of a resource allocation area to which no data addressed to each terminal device of the plurality of terminal devices is allocated among resource allocation areas for the spatial multiplexing transmission which are allocated to each terminal device of the plurality of terminal devices, an additional data generator that generates additional data corresponding to the additional data area allocated by the additional data area setting section, and a transmitter that transmits the data which is addressed to each of the plurality of terminal devices and the additional data.

11 Claims, 17 Drawing Sheets

(51) Int. Cl.
    H04B 7/06      (2006.01)
    H04B 17/00     (2006.01)
    H04L 5/00      (2006.01)
    H04W 52/32     (2009.01)
    H04W 72/04     (2009.01)
    H04W 88/08     (2009.01)
    H04L 1/00      (2006.01)
    H04L 1/08      (2006.01)

(52) U.S. Cl.
    CPC ........... *H04L5/0037* (2013.01); *H04W 52/325* (2013.01); *H04W 72/046* (2013.01); *H04W 88/08* (2013.01); *H04B 7/0632* (2013.01); *H04L 1/0063* (2013.01); *H04L 1/08* (2013.01); *H04L 5/0007* (2013.01); *H04L 5/0051* (2013.01); *H04W 72/0446* (2013.01); *H04W 72/0453* (2013.01); *H04L 1/0025* (2013.01)

(56) References Cited

U.S. PATENT DOCUMENTS

| | | | |
|---|---|---|---|
| 2006/0203891 | A1 | 9/2006 | Sampath et al. |
| 2006/0285479 | A1* | 12/2006 | Han et al. ............... 370/203 |
| 2007/0281746 | A1 | 12/2007 | Takano et al. |
| 2008/0108314 | A1 | 5/2008 | Mihota |
| 2008/0279148 | A1* | 11/2008 | Yang et al. ............. 370/330 |
| 2009/0052578 | A1 | 2/2009 | Sawai |
| 2009/0147748 | A1 | 6/2009 | Ofuji et al. |
| 2009/0154419 | A1 | 6/2009 | Yoshida et al. |
| 2009/0196203 | A1* | 8/2009 | Taira et al. ............. 370/280 |
| 2009/0196364 | A1 | 8/2009 | Nakajima et al. |
| 2009/0262699 | A1* | 10/2009 | Wengerter et al. ........ 370/330 |
| 2010/0054353 | A1* | 3/2010 | Roh et al. ............... 375/260 |
| 2011/0064044 | A1 | 3/2011 | Ofuji et al. |
| 2011/0149942 | A1 | 6/2011 | Ko et al. |
| 2012/0188881 | A1 | 7/2012 | Ma et al. |

FOREIGN PATENT DOCUMENTS

| | | |
|---|---|---|
| JP | 2009171535 A | 7/2009 |
| JP | 2009-173369 A | 8/2009 |
| RU | 2007 137 461 A | 4/2009 |
| WO | 2006/013858 A1 | 2/2006 |
| WO | 2007/124566 A1 | 11/2007 |
| WO | 2009/078651 A2 | 6/2009 |

OTHER PUBLICATIONS

Search and Examination Report, mailed Apr. 18, 2013, for corresponding Singapore Application No. 201200482-6, 13 pages.

"3rd Generation Partnership Project; Technical Specification Group Radio Access Network; Physical layer aspects for evolved Universal Terrestrial Radio Access (UTRA) (Release 7)," Technical Report, 3GPP TR 25.814 V7.1.0, Sep. 2006, 132 pages.

Extended European Search Report, dated Dec. 9, 2014, for corresponding European Application No. 10802055.3-1855 / 2458764, 9 pages.

International Search Report, mailed Oct. 12, 2010, for PCT/JP2010/004459, 2 pages.

Foschini, G., "Layered Space-Time Architecture for Wireless Communication in a Fading Environment When Using Multi-Element Antennas," Bell Labs Technical Journal, Autumn 1996, pp. 41-59.

IEEE 802.16 Broadband Wireless Access Working Group, "Clean-up of TTG/RTG and Irregular Subframe in IEEE 802.16m SDD and Amendment Working Document," Jan. 12, 2009, 10 pages.

IEEE 802.16 Broadband Wireless Access Working Group, "Text proposal on DL Map," Apr. 27, 2009, 6 pages.

Japanese Patent Office, Collection of Standard Technology of Japanese Patent Office (MIMO Related Art), https://www.jpo.go.jp/shiryou/s_sonota/hyoujun_gijutsu/mimo/mokuji.htm, 96 pages.

Lee, et al., A Space-Frequency Transmitter Diversity Technique for OFDM Systems, IEEE GLOBECOM2000, vol. 3 2000, pp. 1473-1477.

3GPP TS 36.211 V8.3.0 (May 2008), 3rd Generation Partnership Project; Technical Specification Group Radio Access Network; Evolved Universal Terrestrial Radio Access (E-UTRA); Physical Channels and Modulation (Release 8), 77 pages.

Decision on Grant, dated Mar. 6, 2014, for corresponding Russian patent Application No. 2012102258/07(003185), 15 pages.

Motorola, "Proposal for Dedicated Pilots in Downlink Precoding for EUTRA MIMO," R1-072155, Agenda Item: 7.11.1, 3GPP TSG RAN WG1 Meeting #49, Kobe, Japan, May 7-11, 2007, 5 pages.

* cited by examiner

FIG. 19
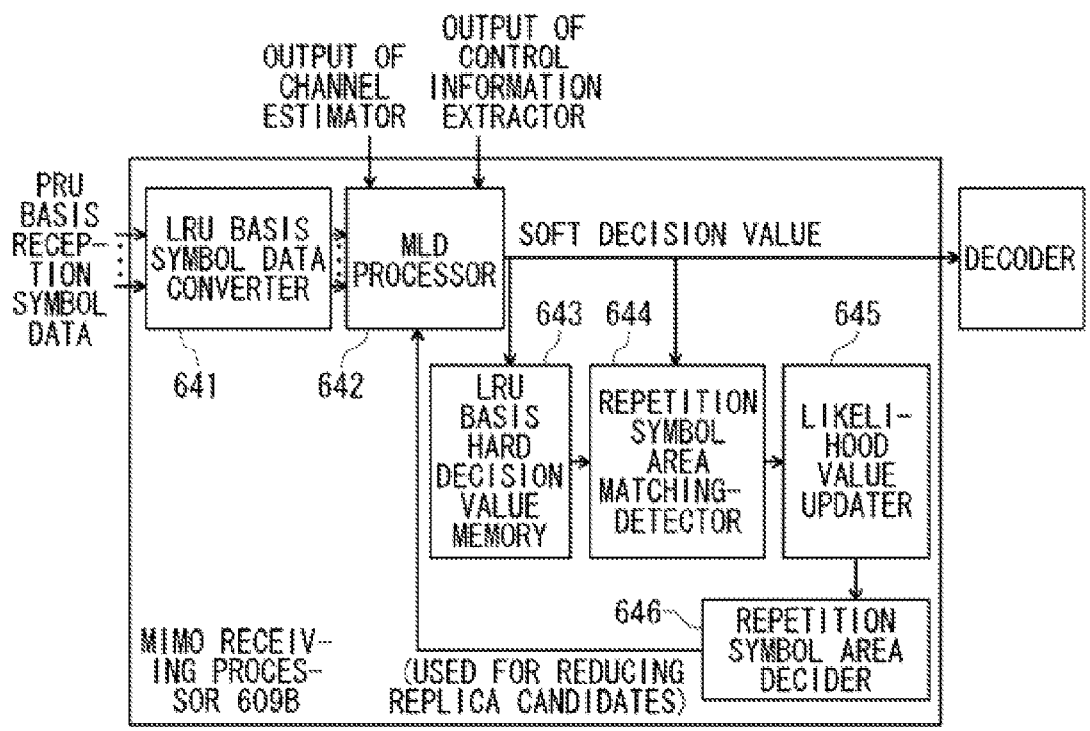
FIG. 20
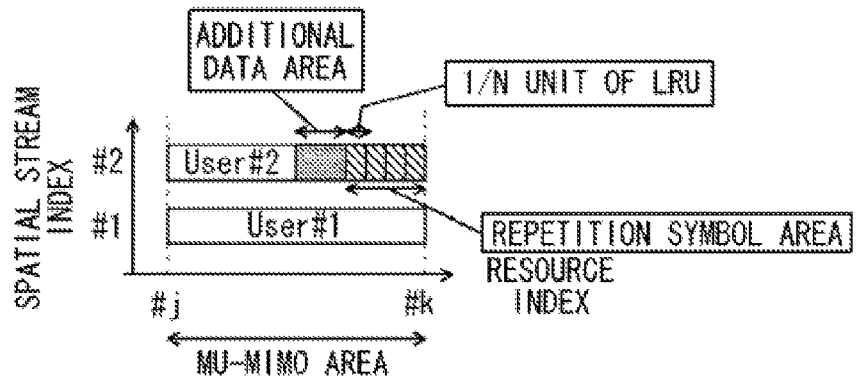
FIG. 21
| A-MAP | A-MAP | A-MAP | A-MAP | | | | |
|---|---|---|---|---|---|---|---|
| DL SF0 | DL SF1 | DL SF2 | DL SF3 | UL SF4 | UL SF5 | UL SF6 | UL SF7 |

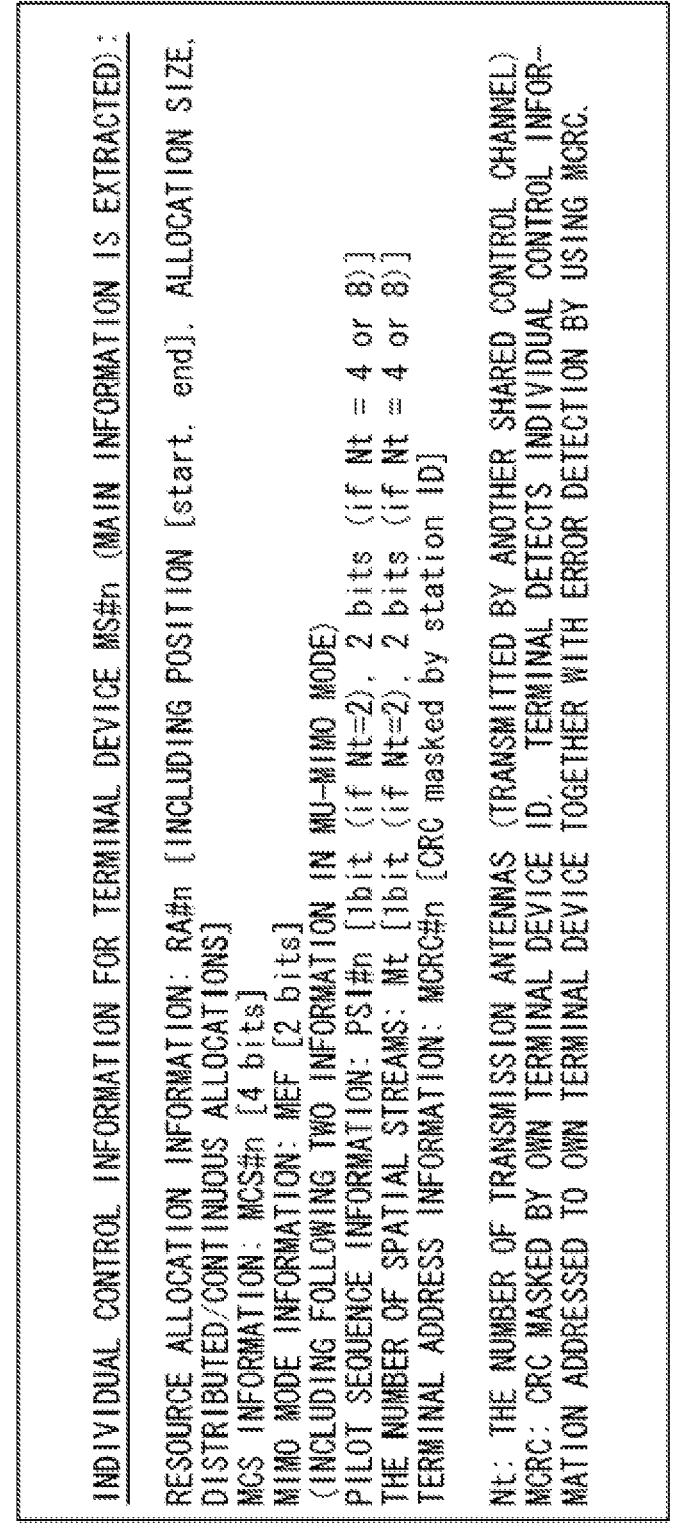

FIG. 22

INDIVIDUAL CONTROL INFORMATION FOR TERMINAL DEVICE MS#n (MAIN INFORMATION IS EXTRACTED):

RESOURCE ALLOCATION INFORMATION: RA#n [INCLUDING POSITION [start, end], ALLOCATION SIZE, DISTRIBUTED/CONTINUOUS ALLOCATIONS]
MCS INFORMATION: MCS#n [4 bits]
MIMO MODE INFORMATION: MEF [2 bits]
(INCLUDING FOLLOWING TWO INFORMATION IN MU-MIMO MODE)
PILOT SEQUENCE INFORMATION: PSI#n [1bit (if Nt=2), 2 bits (if Nt = 4 or 8)]
THE NUMBER OF SPATIAL STREAMS: Nt [1bit (if Nt=2), 2 bits (if Nt = 4 or 8)]
TERMINAL ADDRESS INFORMATION: MCRC#n [CRC masked by station ID]

Nt: THE NUMBER OF TRANSMISSION ANTENNAS (TRANSMITTED BY ANOTHER SHARED CONTROL CHANNEL)
MCRC: CRC MASKED BY OWN TERMINAL DEVICE ID. TERMINAL DETECTS INDIVIDUAL CONTROL INFORMATION ADDRESSED TO OWN TERMINAL DEVICE TOGETHER WITH ERROR DETECTION BY USING MCRC.

FIG. 27
| BIT EXPRESSION | MODULATION INFORMATION FORMAT |
|---|---|
| 0b00 | QPSK |
| 0b01 | 16QAM |
| 0b10 | 64QAM |
| 0b11 | N/A |
FIG. 28
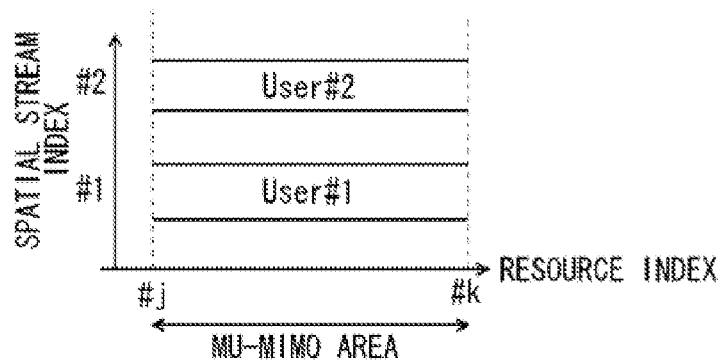
FIG. 29
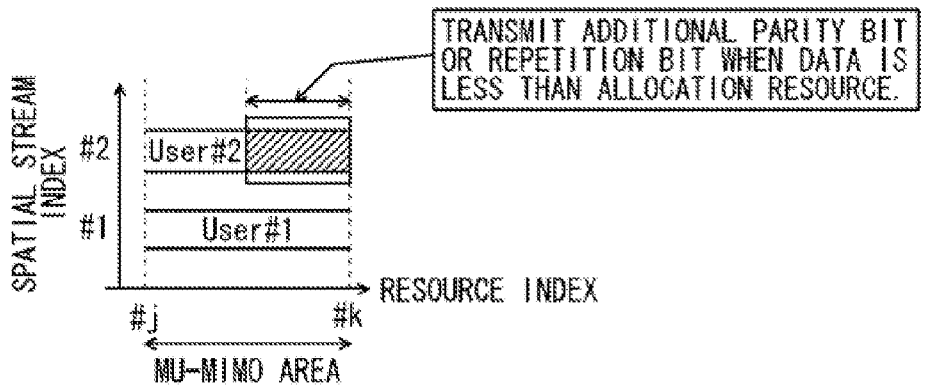

WIRELESS COMMUNICATION DEVICE AND WIRELESS COMMUNICATION METHOD

TECHNICAL FIELD

The present invention relates to a wireless communication device and a wireless communication method using a multiuser MIMO technology.

BACKGROUND ART

In recent years, demands for larger capacity and higher speed of a wireless communication have been growing, and methods for improving an effective availability of finite frequency resources have been actively researched. As one of those methods, attention has been attracted to a technique using a space domain.

In a MIMO (multiple input multiple output) technology, a plurality of antenna elements are equipped in each of a transmitter and a receiver, and spatial multiplexing transmission is realized under a propagation environment that is low in correlativity of reception signals among antennas (refer to Non-patent Literature 1). In this case, the transmitter transmits different data series from a plurality of attached antennas by using a physical channel having the same time, the same frequency, and the same code for each antenna element. The receiver separates and receives the reception signals from a plurality of attached antennas on the basis of the different data series. In this way, a plurality of spatial multiplexing channels is used so that high speed can be achieved without using multilevel modulation. When the transmitter and the receiver are equipped with the same number of antennas under the environments where a large number of scatters exist between the transmitter and the receiver in a sufficient S/N (signal to noise ratio) condition, a communication capacity can be enlarged in proportion to the number of antennas.

Also, as another MIMO technology, a multiuser MIMO technology (multiuser MIMO, or MU-MIMO) has been known. The MU-MIMO technology has been already discussed in a next-generation wireless communication system standard. For example, in a draft of 3GPP LTE standard or IEEE 802.16m standard (hereinafter referred to as "16 m"), the standardization of a transmission system using the multiuser MIMO has been included (refer to Non-patent Literature 2 and Non-patent Literature 3). Hereinafter, as one example, a description will be given of an outline of the multiuser MIMO system in a downlink in the 16m.

FIG. 21 illustrates a frame format in a downlink.

In the figure, SFn (n=an integer of 0 to 7) denotes a subframe. In transmitting individual data of a terminal (or user) using an individual data area (blocks indicated by DL in the figure) in the downlink, a base station device allows control information such as terminal allocation information to be included in a signal to be transmitted from the base station device to a terminal device existing within a communication area. In the 16m, the base station device allows the control information to be included in areas allocated as A-MAP in FIG. 21.

FIG. 22 illustrates an example of main parameters included in the control information (individual control information) for a specific terminal device MS#n. Resource allocation information RA#n that is one of the parameters illustrated in FIG. 22 includes information related to a position, an allocation size, and distributed/continuous mapping of a transmission area of individual data of the terminal (or user) in the individual data area DL to be transmitted by using an OFDM symbol subsequent to A-MAP.

In MIMO mode information MEF illustrated in FIG. 22, transmission information of a spatial multiplexing mode or a temporal-spatial diversity transmission mode is transmitted. When the MIMO mode information MEF indicates the MU-MIMO mode, the MIMO mode information MEF further includes pilot sequence information PSI#n and the number of spatial streams Mt in the MU-MIMO as a whole. The MCS information notifies the terminal device MS#n of modulation multi-level value of the spatial stream and code rate information.

The MCRC#n that is terminal destination information illustrated in FIG. 22 is CRC information masked with terminal identification information CID (connection ID) allocated to the terminal MS#n by the base station device at the time of establishing a connection. With this information, the terminal device detects individual control information addressed to the own station together with error detection.

A description will be given of the operation of a conventional base station device 80 that performs the above-mentioned MU-MIMO transmission with reference to FIG. 23. FIG. 23 is a block diagram illustrating a configuration of the conventional base station device 80 and a conventional terminal device 90 (terminal device MS#n; n is a natural number). The base station device 80 illustrated in FIG. 23 notifies the individual terminal of the MU-MIMO allocation information through a downlink individual control channel allocated as an A-MAP, prior to the MU-MIMO transmission. As illustrated in FIG. 22, the MU-MIMO allocation information includes, as parameters necessary for a receiving process at the terminal device MS#n side, the number of spatial streams (MO, the code rate and modulation information MCS#n of the error correcting code performed on a spatial stream addressed to MS#n, pilot information (PSI#n) addressed to the MS#n, and resource allocation information RA#n addressed to the MS#n. In this case, n=1, . . . Mt. Also, it is assumed that one spatial stream is allocated to the terminal device MS#n.

A control information and data generator 84#n includes an individual pilot generator 85, a modulated data generator 86, a precoding weight multiplier 87, and an individual control information generator 88, and generates individual control information and data for the terminal device MS#n.

The individual control information generator 88 generates an individual control signal including the above-mentioned MU-MIMO allocation information. The modulated data generator 86 generates a modulated data signal #n addressed to the terminal device MS#n that performs the spatial multiplexing transmission on the basis of the code rate and modulation information MCS#n. The individual pilot generator 85 generates a pilot signal #n used for channel estimation on the basis of pilot information (PSI#n) addressed to the MS#n. The precoding weight multiplier multiplies the modulated data signal #n by the pilot signal #n with the use of a common precoding weight #n to generate spatial streams. The spatial multiplexing streams are generated by the number of spatial multiplexing streams (Mt) by the control information and data generator 84#n1, . . . #Mt.

An OFDM symbol configuration section 81 allocates an individual control signal to an A-MAP control information area on an OFDM symbol. Further, the spatial streams that are individual data addressed to Mt terminal devices are mapped to a source based on the resource allocation information RA#n by spatial multiplexing. IFFTs sections 82 performs OFDMA modulation on an output of the OFDM symbol configuration section, and add a cyclic prefix (or guard interval) thereto. After frequency conversion, the outputs are transmitted from respective antennas 83.

In this case, because in a precoded MIMO propagation channel the channel estimation can be performed with the use of the pilot signal precoded by the same precoding weight as that of the data signal, the MIMO mode information requires no precoding information.

Also, the MIMO propagation channel in the terminal device MS#n can be estimated with the use of signals orthogonal to each other between the spatial multiplexing streams using frequency division as the respective pilot signals.

On the other hand, the terminal device MS#n performs the following terminal receiving process. First, the terminal device MS#n detects the MU-MIMO allocation information addressed to the own terminal device from a downlink individual control signal received by a downlink control information detector 92 through antennas 91. Then, the terminal device MS#n extracts data in an area where the resource is allocated to the MU-MIMO transmission from data in which OFDMA demodulation not shown has been performed.

Then, an MIMO separator 93 performs the channel estimation of the MIMO propagation channel with the use of the pilot signal precoded by the number of spatial multiplexing streams (Mt). Further, the MIMO separator 93 generates a reception weight based on MMSE criteria on the basis of the result of the channel estimation of the MIMO propagation channel and pilot information (PSI) addressed to the own terminal device, and separates a stream addressed to the own terminal device from the data in the resource allocated area which has been spatially multiplexed. Then, after separation of the stream addressed to the own terminal device, the terminal device MS#n demodulates and decodes the stream with the use of the MCS information by a demodulator/decoder 94.

In this case, the resource allocation information RA#n addressed to the MS#n which is a parameter required for the receiving process at the terminal device MS#n side includes distributed/continuous mapping information, position (start, end) information, and allocation size information.

In the 16m, the resources are placed on the basis of a physical resource unit (PRU) including a given OFDM symbol and subcarrier. A given number of pilot signals are arranged within the PRU.

FIG. 24 illustrates an example of a physical resource unit (PRU) configuration at the time of transmitting two streams. The PRU illustrated in FIG. 24 includes 6 OFDM symbols and 18 subcarriers. The PRU includes 12 pilot symbols (blocks indicated by 1 or 2 in the figure) and 96 data symbols.

Also, there are two kinds of resource allocation methods which are a continuous mapping (Continuous Resource Unit (CRU) or localized Resource Unit), and a distributed mapping (Distributed Resource Unit (DRU)). The continuous mapping continuously allocates a resource to the terminal device with the subcarriers whose reception quality is relatively high, on the basis of a reception quality status from the terminal device. This is a resource allocation method particularly suitable for a case in which a travel speed of the terminal is low, and a temporal change in the reception quality is gentle. On the other hand, the distributed mapping allocates the resources distributed on the subcarriers to the terminal to easily obtain a frequency diversity effect. This is a resource allocation method particularly suitable for a case in which the travel speed of the terminal is high, and the temporal change in the reception quality is severe.

<Resource Allocation Method: Continuous Mapping>

Subsequently, a description will be given of the continuous mapping that is the resource allocation method with reference to FIG. 25.

The individual data of the user (individual data or user individual data) which is transmitted to the terminal device, individually, is allocated to the physical resource unit PRU with a logical resource unit (LRU) as a unit. In this example, the LRU includes data as much as the number of data symbols except for the pilot symbols included in the PRU, and is allocated to a data symbol placed portion in the physical resource PRU in a given order. Also, the LRU is allocated to the continuous subcarriers with one PRU as a unit (hereinafter called "miniband unit") or n plural PRUs as an assembled unit (hereinafter called "subband unit"). FIG. 25 illustrates an example of the resource continuous mapping using the subband of n=4. As illustrated in FIG. 25, in the individual data of the user, LRU#1 to LRU #4 are allocated to PRU#1 to PRU#4, respectively.

<Resource Allocation Method: Distributed Mapping>

Subsequently, a description will be given of the distributed mapping that is the resource allocation method with reference to FIG. 26.

The individual data of the user which is transmitted to the terminal device, individually, is allocated to the physical resource unit PRU with the logical resource unit LRU as a unit. In this example, the LRU includes data as much as the number of data symbols except for the pilot symbols included in the PRU. A subcarrier, interleaver (or tone permutation) distributes a plurality of LRU data into a plurality of PRU in conformity to a given rule.

As illustrated in FIG. 26, when a transmission diversity manner such as an SFBC (space-frequency block coding) is applied in the subcarrier leaver, in order to ensure continuity between two subcarriers, the distributed mapping is performed with the two subcarriers as one unit (two-subcarrier based interleaver or two-tone based permutation).

The SFBC is disclosed in Non-patent Literature 6.

Also, when the maximum likelihood estimation (MLD) reception that obtains a high reception quality at the time of receiving the MU-MIMO is applicable in the terminal device, "modulation information on the spatial streams addressed to another user" which are spatially multiplexed at the same time is further included in the individual control information.

FIG. 27 illustrates an example of bit allocation (per one user) of the modulation information on another user as disclosed in Non-patent literature 5. Referring to FIG. 27, another user is informed of any modulation format of QPSK, 16QAM, and 64QAM (constellation information at the time of modulation) by use of 2 bits.

CITATION LIST

Non-Patent Literatures

Non-patent Literature 1: G. J. Foschini, "Layered space-time architecture for wireless communication in a fading environment when using multi-element antennas", BellLabs Tech. J. Autumn of 1996, pp. 41-59

Non-patent Literature 2: 3GPP TS36.211 V8.3.0 (2008-05)

Non-patent Literature 3: IEEE 802.16m-09/0010r2, "Air Interface for Fixed and Mobile Broadband Wireless Access Systems: Advanced Air Interface (working document)"

Non-patent Literature 4: Collection of Standard Technology of Japanese Patent Office (MIMO Related Art) https://www.jpo.go.jp/shiryou/s_sonota/hyoujun_gijutsu/mimo/mokuji.htm Non-patent Literature 5 IEEE C802.16m-09/1017, "Text proposal on DL MAP", Amir Khojastepour, Narayan Prasad, Sampath Rangarajan, Nader Zein, Tetsu Ikeda, Andreas Maeder (2009 Apr. 27)

Non-patent Literature 6: King F. Lee and Douglas B. Williams, "Space-Frequency Transmitter Diversity Technique for OFDM Systems", IEEE GLOBECOM2000, Vol. 3 2000, pp. 1473-1477

SUMMARY OF THE INVENTION

Technical Problem

In the above-mentioned MU-MIMO transmission, a plurality of terminals (users) share the same physical resources by spatial multiplexing. In this case, there is a method in which the users having common allocation size notified as the resource allocation information RA included in the individual control information are allocated as the MU-MIMO users. The method will be described with reference to FIG. 28. FIG. 28 is a diagram illustrating an example of the allocation of the MU-MIMO user. The axis of ordinate in FIG. 28 expresses an index of the spatial stream, and the axis of abscissa in FIG. 28 expresses an index of the resource. In this example, the MU-MIMO area represented in the axis of abscissa in FIG. 28 represents the resource allocation area to which the resource that performs the spatial multiplexing transmission is allocated.

In FIG. 28, the users having common allocation resource size are MU-MIMO-allocated to each of two users (User#1, User#2) by the use of one spatial stream (the number of spatial multiplexing is 2). The MU-MIMO user allocation method illustrated in FIG. 28 has such an advantage that the transmission can be performed with the use of the minimum resource without wasting the spatial resource for the same physical resource and for satisfying a given reception quality.

However, in the MU-MIMO user allocation method illustrated in FIG. 28, there is a need to perform the MU-MIMO transmission by combining the users having common allocation source size together, and a load of a scheduler that performs the user allocation in performing the MU-MIMO is increased. Also, when the number of combinations of the users having common allocation resource size is small, the MU-MIMO transmission mode cannot be used, leading to a loss of chances for performing the MU-MIMO transmission. As a result, in the MU-MIMO user allocation method illustrated in FIG. 28, the spatial multiplexing transmission cannot be flexibly used, and the frequency use efficiency is degraded.

On the other hand, there is a method in which the users having different allocation resource sizes notified as the resource allocation information RA included in the individual control information are allocated as the MU-MIMO users. FIG. 29 is a diagram illustrating another example of the allocation of the MU-MIMO user. The axis of ordinate in FIG. 29 expresses an index of the spatial stream, and the axis of abscissa in FIG. 29 expresses an index of the resource. In this example, the MU-MIMO area represented in the axis of abscissa in FIG. 29 represents the resource allocation area of the user to which the maximum resource size is allocated among a plurality of users who perform the spatial multiplexing transmission at the same time, in performing the MU-MIMO transmission.

In FIG. 29, the users having different allocation resource sizes are MU-MIMO-allocated to each of two users (User#1, User#2) by the use of one spatial stream (the number of spatial multiplexing is 2). As illustrated in FIG. 29, a portion (shaded portion in the figure) that does not satisfy the MU-MIMO area that performs the MU-MIMO transmits additional data to the User#2 that is a user having small allocation resource size as the user data of the User#2, to thereby effectively use the spatial resource. In this example, the additional data added as the user data of the User#2 excessively adds a parity bit obtained in conducing error correction coding, and transmits the parity bit (parity bit addition transmission). Alternatively, the addition data added as the user data of the User#2 repetitively transmits the bit series of a specific portion (repetition bit transmission).

In the MU-MIMO user allocation method illustrated in FIG. 29, even in the combination of the users having different allocation resource sizes, because the MU-MIMO transmission mode can be used, a load of the scheduler that performs the user allocation in performing the MU-MIMO is reduced. Also, the chances for performing the MU-MIMO transmission are increased. For that reason, in the MU-MIMO user allocation method illustrated in FIG. 29, because the spatial multiplexing transmission can be flexibly used, even if the number of combinations of the users having common allocation resource size is small, the frequency use efficiency can be improved. Also, because of the transmission of the additional data, the user having small allocation resource size obtains the effect of improving the reception quality. In FIG. 29, the reception quality of the user User#2 allocated to the spatial stream #2 is improved.

However, in the MU-MIMO user allocation method illustrated in FIG. 29, when the resource size of the user having small allocation resource size is sufficiently small with respect to the MU-MIMO area, the data reception quality of the user becomes an excessive quality. On the other hand, the reception quality of the spatial stream of the users large in the allocation resource size is not changed, resulting in such a problem that the reception quality among the spatial streams is biased.

An object of the present invention is to provide a wireless communication device and a wireless communication method, which can suppress a bias of the reception quality among the spatial streams to the plurality of terminal device.

Solution to Problems

A wireless communication device according to an aspect of the invention is a wireless communication device for performing a spatial multiplexing transmission with respect to a plurality of terminal devices, the wireless communication device including: an additional data area setting section that is configured to allocate, as an additional data area, a part of a resource allocation area to which no data addressed to each terminal device of the plurality of terminal devices is allocated among resource allocation areas for the spatial multiplexing transmission which are allocated to each terminal device of the plurality of terminal devices; an additional data generator that is configured to generate additional data corresponding to the additional data area allocated by the additional data area setting section; and a transmitter that is configured to transmit the data which is addressed to each terminal device of the plurality of terminal devices and the additional data.

A wireless communication device according to an aspect of the invention is also a wireless communication device for performing a spatial multiplexing transmission with respect to a plurality of terminal devices, the wireless communication device including: a null data area setting section that is configured to allocate, as a null data area, a part of a resource allocation area to which no data addressed to each terminal device of the plurality of terminal devices is allocated among resource allocation areas for the spatial multiplexing transmission which are allocated to each terminal device of the plurality of terminal devices; a null data area signal generator that is configured to generate a null data signal to be transmitted to each terminal device of the plurality of terminal devices in the null data area; and a transmitter that is configured to transmit the data which is addressed to the plurality of terminal devices and the null data signal.

A wireless communication method according to an aspect of the invention is a wireless communication method for performing a spatial multiplexing transmission with respect to a plurality of terminal devices, the wireless communication method including: an additional data area setting step of allocating, as an additional data area, a part of a resource allocation area to which no data addressed to each terminal device of the plurality of terminal devices is allocated among resource allocation areas for the spatial multiplexing transmission which are allocated to each terminal device of the plurality of terminal devices; an additional data generating step of generating additional data corresponding to the additional data area allocated by the additional data area setting section; and a transmitting step of transmitting the data which is addressed to each terminal device of the plurality of terminal devices and the additional data.

A wireless communication method according to an aspect of the invention is also a wireless communication method for performing a spatial multiplexing transmission with respect to a plurality of terminal devices, the wireless communication method including: a null data area setting step of allocating, as a null data area, a part of a resource allocation area to which no data addressed to each terminal device of the plurality of terminal devices is allocated among resource allocation areas for the spatial multiplexing transmission which are allocated to each terminal device of the plurality of terminal devices; a null data area signal generating step of generating a null data signal to be transmitted to each terminal device of the plurality of terminal devices in the null data area; and a transmitting step of transmitting the data which is addressed to the plurality of terminal devices and the null data signal.

Advantageous Effects of the Invention

According to the wireless communication device and the wireless communication method of the present invention, the bias of the reception quality among the spatial streams to the plurality of terminal device can be suppressed in the multiuser MIMO transmission.

BRIEF DESCRIPTION OF THE DRAWINGS

FIG. 19 is a block diagram illustrating a configuration of an MIMO receiving processor 609B of a terminal device 600B.

FIG. 20 is a schematic diagram in a case of setting a repetitive symbol period with UN of an LRU as a unit in the two-user MU-MIN mode.

FIG. 21 is a diagram illustrating a frame format in a downlink discussed in an IEEE 802.16m standard draft.

FIG. 22 is a diagram illustrating an example of MU-MIMO allocation information for an n-th terminal, device MS#n.

FIG. 27 is a diagram illustrating an example of bit mapping of modulation information on another user.

FIG. 28 is a diagram illustrating one example of allocation of an MU-MIMO user.

FIG. 29 is a diagram illustrating another example of allocation of the MU-MIMO user.

MODES FOR CARRYING OUT THE INVENTION

Hereinafter, embodiments of the present invention will be described with reference to the drawings.

First Embodiment

Figure 1:
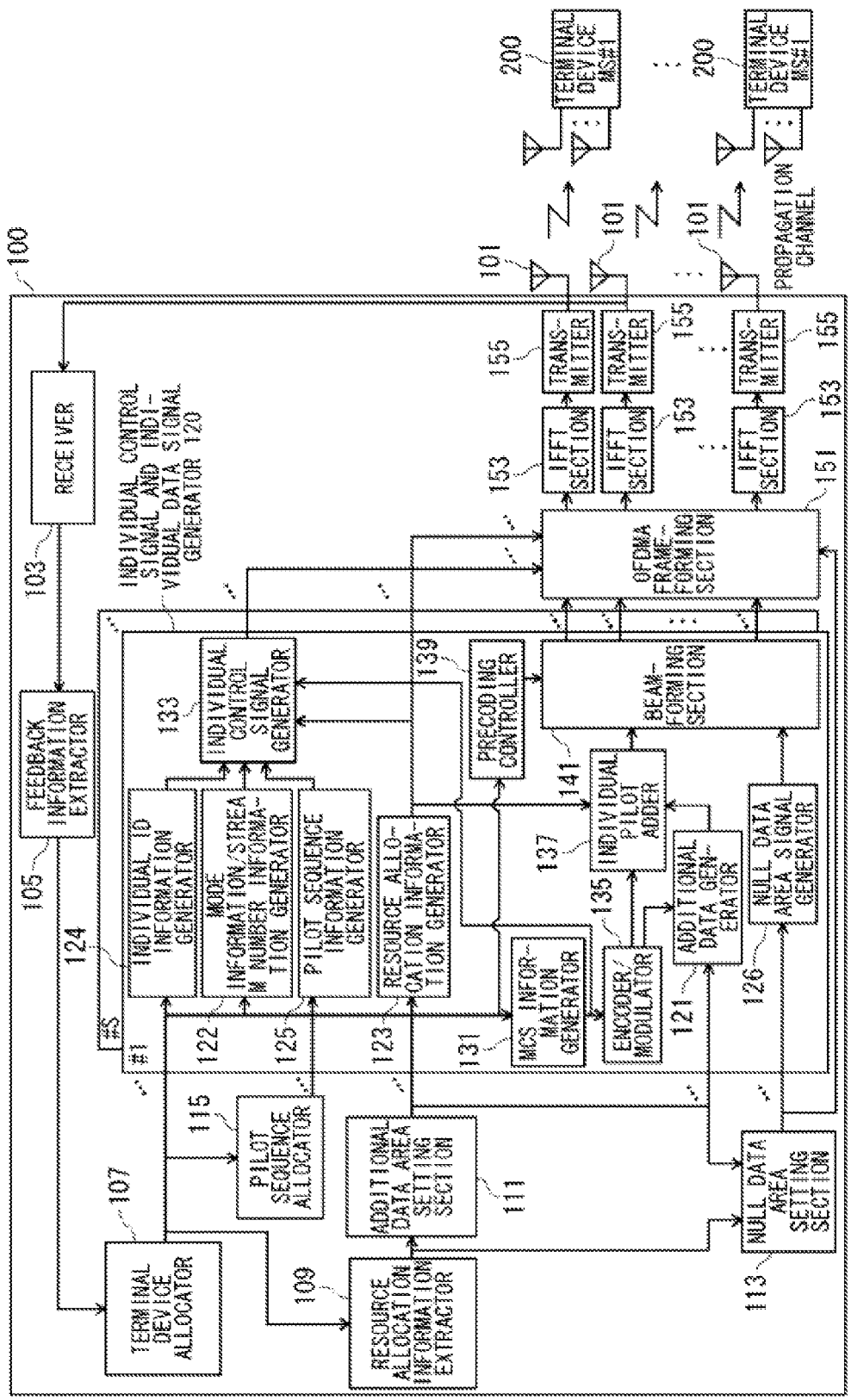
FIG. 1 is a diagram illustrating a configuration of a base station device 100 according to a first embodiment.

A first embodiment will be described with reference to FIGS. 1 to 11. FIG. 1 is a diagram illustrating a configuration of a base station device 100 according to the first embodiment. FIG. 1 illustrates the configuration of a case in which the base station device 100 performs multiuser MIMO transmission with respect to a terminal device MS#1 to a terminal device MS#S, which are S number of terminal devices 200, as an example.

The base station device 100 illustrated in FIG. 1 includes a plurality of antennas 101 configuring a base station antenna, a receiver 103, a feedback information extractor 105, a terminal device allocator 107, a resource allocation information extractor 109, an additional data area setting section 111, a null data area setting section 113, a pilot sequence allocator 115, an individual control signal and individual data signal generator 120, an OFDMA frame-forming section 151, a plurality of IFFT sections 153, and a plurality of transmitters 155. A configuration of the individual control signal and individual data signal generator 120 will be described later.

The base station antenna includes the plurality of antennas 101 that receive and transmit a high-frequency signal.

The receiver 103 demodulates and decodes a reception signal from the base station antenna.

The feedback information extractor 105 extracts feedback information transmitted by the terminal device MS#n, from data decoded by the receiver 103. In this example, the feedback information from the terminal device MS#n includes reception quality information and desired precoding weight information. In this example, n is a value of 1 to S.

The terminal device allocator 107 determines the combination of the terminal devices that perform the multiuser MIMO transmission, the resource allocation of a frequency or a time to the terminal devices used for the multiuser MIMO transmission, and a transmission format to each terminal device (modulation multi-level value, the code rate of the error correcting code, or the precoding weight) on the basis of the feedback information extracted by the feedback information extractor 105 so as to satisfy a required quality.

[Resource Allocation in MU-MIMO Transmission]

Hereinafter, a description will be given in detail of the resource allocation in the MU-MIMO transmission, which is one feature of the present invention. The terminal device allocator 107 determines the resource allocation information RA#1 to #S with respect to the plurality of terminal devices MS#1 to #S that perform the MU-MIMO transmission, respectively. In this example, the resource allocation information RA#1 to #S includes the following three pieces of information. The terminal device allocator 107 determines those pieces of information.

As one piece of information of the resource allocation information RA#1 to #S, the terminal device allocator 107 determines the resource allocation size when using the MCS necessary to satisfy the required quality, as a size RA_SIZE#1 to #S which is an integral multiple of a basic unit with an LRU as the basic unit, on the basis of the amount of data to be transmitted to the respective terminal devices MS#1 to #S, and the reception quality status fed back from the terminal device MS#n.

As one piece of information of the resource allocation information RA#1 to #S, the terminal device allocator 107 determines start positions (RA_START#1 to #S) of the resource allocation with the use of an index of the LRU.

As one piece of information of the resource allocation information RA#1 to #S, the terminal device allocator 107 determines whether a distributed mapping (DRU) or a continuous mapping (CRU), which is a allocation method (RA_PLACEMENT), is used. The allocation method is common to all of the terminal device MS#1 to #S that perform the multiuser MIMO transmission.

Hereinafter, in this embodiment, a description will be given of a case in which the terminal device allocator 107 determines that only the continuous mapping (CRU) is used as the allocation method (RA_placement).

The resource allocation information extractor 109 extracts the resource allocation information RA#1 to #S (that is, including RA_SIZE#1 to #S, RA_START#1 to #S, and RA_PLACEMENT (CRU) to the terminal device MS#1 to #S that perform the MU-MIMO transmission, which are determined by the terminal device allocator 107.

When RA_SIZE#1 to #S included in the resource allocation information RA#1 to #S is different from each other (including a case in which RA_START#1 to #S is different even if RA_SIZE#1 to #S is the same), the additional data area setting section 111 detects an area including the minimum and the maximum of indexes of the LRU used for allocation to the terminal device M#1 to #S that perform the MU-MIMO transmission as an MU-MIMO area, from RA_START#1 to #S and RA_SIZE#1 to #S information. That is, the MU-MIMO area ([start position, end position]) is defined by the following Expression (1).

[Expression 1]

$$\left[\min_{1 \le n \le S}(RA\_START\#n), \max_{1 \le n \le S}(RA\_START\#n + RA\_SIZE\#n)\right] \quad (1)$$

Further, the additional data area setting section 111 sets the additional data area that enables transmission with the additional data by the use of a partial resource of a resource area (hereinafter called "unfilled resource area RA_UNFILLED#n") in which the resource allocation area [RA_START#n, RA_START#n+RA_SIZE#n] to the terminal device MS#n (n=1 to S in this example) is less than the MU-MIMO area.

In this example, the additional data area is set on the basis of a value LRU_ADD#n that is integer-valued by multiplying the number of LRU included in the unfilled resource area RA_UNFILLED#n by a specific coefficient smaller than 1 (for example, ½, ⅓, ⅔), and rounding up, down, or off the multiplied result.

An upper limit may be provided for the LRU_ADD#n so that when the LRU_ADD#n exceeds the upper limit, the LRU_ADD#n is replaced with the upper limit. As a result, when the unfilled resource area RA_UNFILLED#n is larger, the upper limit is set to the additional data area so that the quality of the spatial stream addressed to the MS#n can be prevented from being excessive.

With above operation, the additional data area is set to an area continuous to the resource allocation area [RA_START#n, RA_START#n+RA_SIZE#n] of the terminal device MS#n in a range not exceeding the MU-MIMO area, on the basis of the LRU_ADD#n determined by the additional data area setting section 111.

In this example, the additional data area is set by selecting one kind of pattern although there are the following three patterns (1) to (3) from a positional relationship between the resource allocation area and the MU_MIMO area of the terminal device MS#n.

As a setting pattern (1) of the additional data area, when an end position of the resource allocation area of the terminal device MS#n matches an end position of the MU-MIMO area, the additional data area is set to an area continuous to [RA_START#n-LRU_ADD#n, RA_START#n−1] in the range not exceeding the MU-MIMO area.

As a setting pattern (2) of the additional data area, when a start position of the resource allocation area of the terminal device MS#n matches a start position of the MU-MIMO area, the additional data area is set to an area continuous to [RA_START#n+RA_SIZE#n+1, A_START#n+RA_SIZE#n+LRU_ADD#n] in the range not exceeding the MU-MIMO area.

As a setting pattern (3) of the additional data area, when the start position and the end position of the resource allocation area of the terminal device MS#n do not match the start position and the end position of the MU-MIMO area, the additional data area is set to an area continuous to [RA_START#n−A. RA_START#n−1] and [RA_START#n+RA_SIZE#n+1, A_START#n+RA_SIZE#n+B] in the range not exceeding the MU-MIMO area. In this example, A and B are distributed so that A+B=LRU_ADD#n is met.

Then, the additional data area setting section 111 outputs additional data area setting information that is set by any one of the above-mentioned setting patterns, area information on the resource allocation area [RA_START#n, RA_START#n+RA_SIZE#n] to the terminal device MS#n including the additional data area, and allocation information RA_PLACEMENT (CRU) to an additional data generator 121, a resource allocation information generator 123, and the null data area setting section 113.

The additional data per se is transmitted from the base station device 100 to the terminal device 200, by the use of the area exceeding the RA_SIZE#n from the start position of the finally determined area of the resource allocation area [RA_START#n, RA_START#n+RA_SIZE#n] including the additional data area (The detail will be described in the description of the operation of the additional data generator 121).

Figure 2:
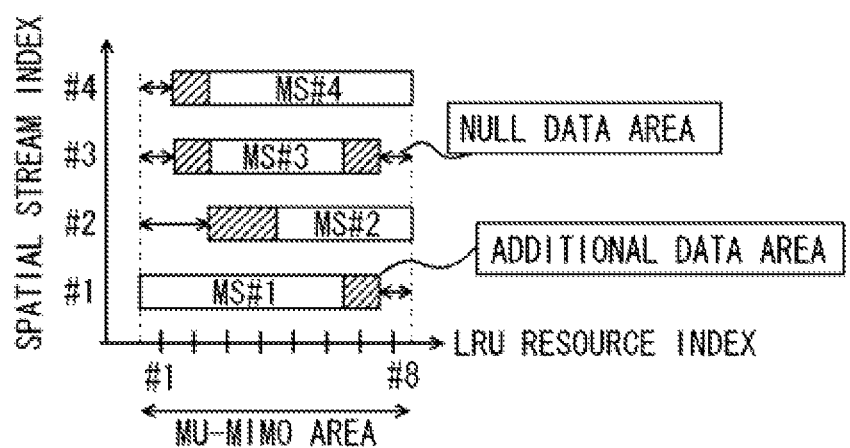
FIG. 2 is a diagram illustrating a resource allocation status in performing MU-MIMO transmission.

Subsequently, a description will be given in detail of the operation of the additional data area setting section 111 when performing the MU-MIMO transmission to the four terminal devices MS#1 to MS#4 with reference to FIG. 2. FIG. 2 is a diagram illustrating a resource allocation status in performing MU-MIMO transmission. The axis of ordinate in FIG. 2 represents an index of the spatial streams, and the axis of abscissa in FIG. 2 represents a resource index (LRU index expression) of an LRU unit. Also, in the figure, blocks not hatched represent the resource allocation areas allocated by the terminal device allocator 107, blocks hatched represent the additional data area, and areas (areas not included in the resource allocation areas and the additional data areas) not blocked which are indicated by arrows in the MU-MIMO area represent null data areas.

In FIG. 2, the MU-MIMO area is [1, 8] (LRU index expression), and expresses an example of setting the additional data area in the case of LRU_ADD#n=(½)RA_UNFILLED#n.

<Terminal Device MS#1>

As illustrated in FIG. 2, the start position of the resource allocation area of the terminal device MS#1 matches the start position #1 of the MU-MIMO area [1, 8]. For that reason, the additional data area setting section 111 sets the additional data area in the setting pattern (2) of the additional data area.

<Terminal Devices MS#2, MS#4>

Also, as illustrated in FIG. 2, the end positions of the resource allocation areas of the terminal devices MS#2 and MS#4 match the end position #8 of the MU-MIMO area [1, 8]. For that reason, the additional data area setting section 111 sets the additional data area in the setting pattern (1) of the additional data area.

<Terminal Device MS#3>

Further, as illustrated in FIG. 2, the start position and the end position of the resource allocation area of the terminal device MS#3 do not match the start position #1 and the end position #8 of the MU-MIMO area [1, 8]. For, that reason, for that reason, the additional data area setting section 111 sets the additional data area in the setting pattern (3) of the additional data area.

When the continuous mapping (CRU) is performed on a subband unit basis, configured by a given number of PRUs continuous in a frequency domain, setting of the additional data area by the additional data area setting section 111 is performed so that the null data area becomes an integral multiple of the subband unit. This is because of the following reasons.

Figure 3:
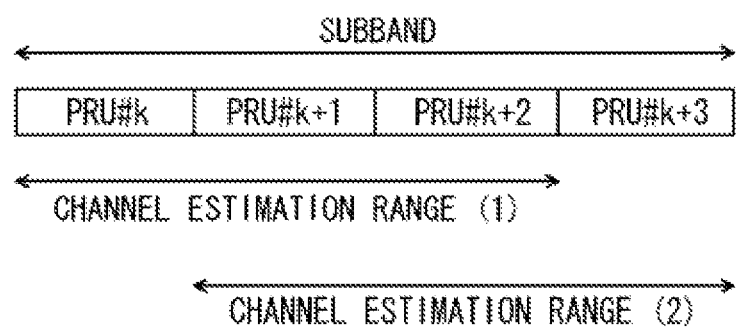
FIG. 3 is a diagram illustrating a channel estimation range using a subband unit.

When the continuous mapping (CRU) of the subband unit is performed, there is generally used a technique in which the channel estimation precision is improved by interpolating (averaging) the channel estimation using a pilot symbol between the adjacent PRUs within the subband. FIG. 3 illustrates a channel estimation range based on the subband unit configured by four PRU#k, #k+1, #k+2, and #k+3 continuous in the frequency domain. Referring to FIG. 3, a channel estimation range (1) is used for the PRU#k and #k+1, and a channel estimation range (2) is used for the PRU#k+2 and #k+3 to perform the channel estimation. As a result, the channel estimation can be performed by using the pilot symbol included in the adjacent PRU, and an error in the channel estimation can be reduced.

When the continuous mapping (CRU) of the subband unit as illustrated in FIG. 3 is performed, if the additional data area is set so that the null data area is less than the integral multiple of the subband unit, the subband including the data area (the resource allocation area or the additional data area) and the null data area is configured. In the data area, the pilot symbol is transmitted as usual. However, in a null data area signal generator 126 that will be described later, a signal for transmitting the pilot symbol as a null pilot (transmitting with a transmission power 0) is generated in the null data area. For that reason, in performing the channel interpolation between the PRUs spanning the data area and the null data area, a method of transmitting the pilot symbol is different between those areas. Therefore, an error in the channel estimation is increased.

However, as described above, the additional data area setting section 111 sets the additional data area so that the null data area includes the area of the integral multiple of the subband unit. As a result, the channel interpolation is not performed between the PRUs spanning the data area and the null data area at the time of estimating the channel in the terminal device MS#n, thereby enabling an influence of the degradation of the channel estimation to be prevented. When a plurality of null data areas discontinuously exist in the MU-MIMO area as with the MS#3 in FIG. 3, the additional data area is set in each of the null data areas so as to provide an area of the integral multiple of the subband unit.

The null data area setting section 113 sets the resource area (hereinafter called "null data area RA_NULL#n") that is less than the MU-MIMO area on the basis of the area information on the resource allocation area [RA_START#n, RA_START#n+RA_SIZE#n] to the terminal device MS#n (n=1 to S in this example) including the additional data area from the additional data area setting section 111. The MU-MIMO area is detected with the use of information from the resource allocation information extractor 109 as with the additional data area setting section 111.

The pilot sequence allocator 115 determines mapping of the pilot sequence to be transmitted together with the spatial stream to all of the terminal devices MS#1 to #S that perform the MU-MIMO transmission, in other words, the number PSI (pilot stream index) of the pilot sequence. In this example, S represents the number of spatial multiplexing (the number of spatial multiplexing users). When the number of spatial multiplexing is S, a pilot sequence number (PSI≤S) which is a natural number of S or lower is used.

Figure 4:
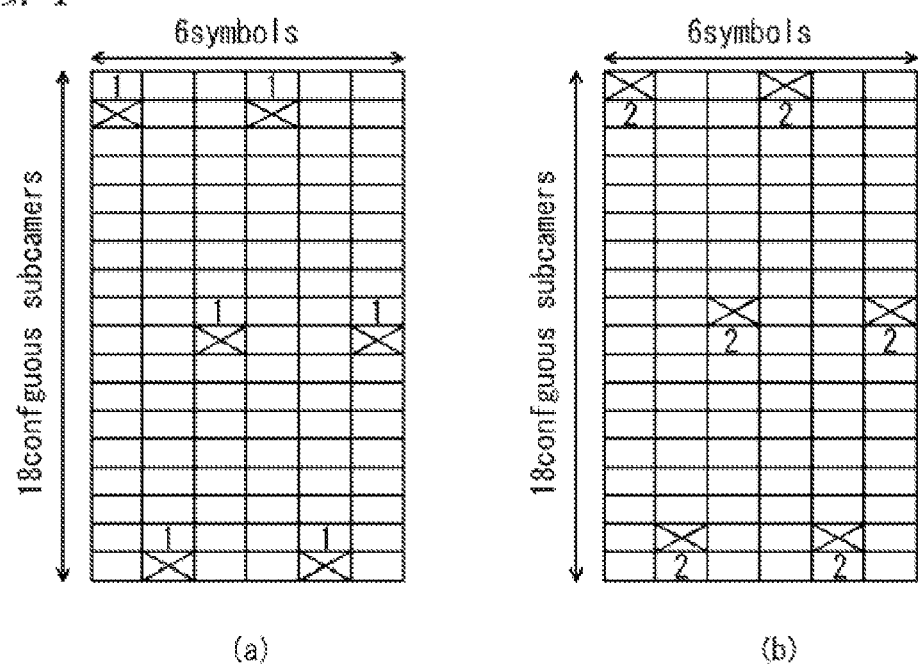
In FIG. 4, (a) and (b) are diagrams illustrating examples of mapping of a pilot sequence and mapping of a data series in two streams, respectively.

In FIG. 4, (a) and (b) are diagrams illustrating examples of mapping of the pilot sequence and mapping of the data series in two streams mapped to the subcarriers including a plurality of OFDM symbols.

In FIG. 4(a), symbols indicated by "1" are pilot symbols in the case of PS1=1, square frames having no description are areas to which data symbols of the spatial streams transmitted together with the pilot sequence of PSI=1 are allocated. In FIG. 4(b), symbols indicated by "2" are pilot symbols in the case of PS1=2, square frames having no description are areas to which data symbols of the spatial streams transmitted together with the pilot sequence of PSI=2 are allocated. Also, in FIG. 4, at (a) and (b), symbols indicated by "x" are null symbols, and the pilots are also time-frequency resources to which data is not also allocated.

The different PSIs have a property having an orthogonal relationship to each other (any one or combination of time, frequency, and code). In FIG. 4, PSI=1 and PSI=2 are orthogonal to each other in the time-frequency resource.

Subsequently, a description will be given of the individual control signal and individual data signal generator 120 configuring a part of the base station device 100 according to the first embodiment with reference to FIG. 1. The individual control signal and individual data signal generator 120 includes a plurality of individual control signal and individual data signal generators #1 to #S.

Further, each of the individual control signal and individual data signal generators #1 to #S includes the additional data generator 121, a mode information/stream number information generator 122, the resource allocation information generator 123, an individual ID information generator 124, a pilot sequence information generator 125, the null data area signal generator 126, an MCS information generator 131, an individual control signal generator 133, an encoder/modulator 135, an individual pilot adder 137, a precoding controller 139, and a beam-forming section 141.

The individual control signal and individual data signal generator #S generates the individual control signal and individual data signal on the basis of the individual resource allocation information for the terminals output from the terminal device allocator 107, the individual additional data area setting information for the terminals output from the additional data area setting section 111, and the individual null data area setting information output from the null data area setting section 113 with respect to the terminal device MS#n. In this example, n=1 to S.

<Configuration Related to Individual Control Signal Generation and Operation Thereof>

Subsequently, a description will be given of a configuration related to the individual control signal generation and operation thereof in the configurations of the individual control signal and individual data signal generator #n below.

The mode information/stream number information generator 122 extracts information on the presence or absence of the multiuser MIMO transmission to the terminal device MS#n allocated by the terminal device allocator 107, and also information on the total number of spatial multiplexing over the terminal devices in the multiuser MIMO mode, and generates the mode information/stream number information based on a given format.

The individual ID information generator 124 extracts the individual ID information on the terminal device MS#n allocated by the terminal device allocator 107, and generates the individual ID information based on a given format.

The pilot sequence information generator 125 extracts the pilot sequence allocation information for the terminal device MS#n from the pilot sequence allocator 115, and generates the pilot sequence information based on a given format.

The MCS information generator 131 extracts information on the modulation multi-level value and the code rate of the error correcting code (hereinafter referred to as "MCS (modulation and coding scheme)") for the terminal device MS#n allocated by the terminal device allocator 107, and generates the MCS information based on a given format.

The individual control signal generator 133 generates the individual control information based on a given format on the basis of outputs of the mode information/stream number information generator 122, the resource allocation information generator 123, the individual ID information generator 124, the pilot sequence information generator 125, and the MCS information generator 131. The individual control signal generator 133 subjects the generated individual control information on a given error detection coding process and an error detection code (CRC code) adding process, and subjects the individual control information on a given modulating process to form an individual control signal.

The resource allocation information generator 123 extracts the resource allocation information for the allocated terminal device MS#n on the basis of the output of the additional data area setting section 111, and generates the allocation information based on a given format. That is, when no additional data area is set by the additional data area setting section 111, the resource allocation information RA#n (that is, including RA_SIZE#n, RA_START#n, RA_PLACEMENT (CRU)).

In this example, when the additional data area is set by the additional data area setting section 111, the resource allocation information generated by the resource allocation information generator 123 includes RA_SIZE#n+LRU_ADD#n that is the size information, the start position information, and the allocation information RA_PLACEMENT (CRU).

The start position information that is one of the resource allocation information generated by the resource allocation information generator 123 is any one of three kinds of patterns (1) to (3) stated below.

As a pattern (1) of the start position information, when the end position of the resource allocation area of the terminal device MS#n matches the end position of the MU-MIMO area, the start position information is RA_START#n−LRU_ADD#n.

As a pattern (2) of the start position information, when the start position of the resource allocation area of the terminal device MS#n matches the start position of the MU-MIMO area, the start position information is RA_START#n+RA_SIZE#n÷1.

As a pattern (3) of the start position information, when the start position and the end position of the resource allocation area of the terminal device MS#n do not match the start position and the end position of the MU-MIMO area, the start position information is RA_START#n−A.

<Configuration Related to Individual Data Signal Generation and Operation Thereof>

Subsequently, a description will be given of the configuration related to the individual data signal generation and operation thereof in the configurations of the individual control signal and individual data signal generator #n below.

The encoder/modulator 135 performs a coding process and a modulating process on the data (individual data) addressed to the terminal device MS#n allocated by the terminal device allocator 107 according to the code rate and the modulation multi-level value based on the MCS information from the MCS information generator 131 to generate symbol data addressed to the terminal device MS#n.

The additional data generator 121 generates bit data according to additional parity bit or repetition bit on the basis of the additional data area information LRU_ADD#n for the terminal device MS#n from the additional data area setting section 111, and further performs a modulating process on the bit data through a modulation system based on the MCS information from the MCS information generator to generate additional data symbol data addressed to the terminal device MS#n.

In this example, as a method of generating the additional data in the additional data generator 121, an example in which punctured coding such as turbo coding is used will be described below.

Punctured coded data such as a turbo code that has been subjected to the error correction coding process in the encoder/modulator 135 is coded by a mother code rate (code rate ½ or ⅓) of the encoder once, and temporarily saved in a circular buffer. In this example, coded bit data including a systematic bit and a parity bit is saved in the circular buffer, and stored in the order of the systematic bit and the parity bit.

The encoder/modulator 135 reads the systematic bit and the parity bit from the coded bit data saved in the circular buffer so as to provide the code rate instructed by the MCS information generator 131.

In this case, the generation of the additional data in the additional data generator 121 reads, from the last position of the parity bit read by the encoder/modulator 135, a follow-on parity bit. The number of read bits is as large as a value (J×D) obtained by multiplying the number of data symbols D indicated by the additional data area information LRU_ADD#n by the number of bits per the modulation symbol in the modulation system instructed by the MCS information generator 131, that is, J bits. In this example, when the read position is a termination position of the circular buffer, the read position returns to a head position of the circular buffer, and the bits are again read from the systematic bit.

The additional data generator 121 generates a modulation symbol by using the same modulation system as the modulation system in the encode/modulator 135 with respect to the additional bit obtained in the above-mentioned method. With the above operation, the additional data generator 121 can generate the symbol data to be transmitted with the use of the additional data area information LRU_ADD#n.

The individual pilot adder 137 adds the individual pilot signal to the symbol data that are outputs of the encoder/modulator 135 and the additional data generator 121 of the terminal device MS#n on the basis of the information from the pilot sequence information generator 125.

In this example, the symbol data is arranged in the order of the output symbol data of the encoder/modulator 135 and the output symbol data of the additional data generator 121 as one output. As a result, even if the additional data symbol exists, the receiving process can be performed by the terminal device without any additional control information. This is because, in the additional data generator 121, the output symbol data of the encoder/modulator 135 and the output symbol data of the additional data generator 121 are symbol data generated from continuous bit data on the circular buffer.

The pilot sequence uses a known signal orthogonal between the series by using time division multiplexing, frequency division multiplexing, or code division multiplexing on an OFDM subcarrier basis. As a result, the terminal device can receive the signal while suppressing interference between the spatial streams, thereby being capable of improving a channel estimation precision of the MIMO propagation channel using the individual pilot signal.

The null data area signal generator 126 generates a signal in the null data area on the basis of the information on the null data area RA_NULL#n for the terminal device MS#n (n=1 to S in this example). That is, the symbol data of the LRU included in the null data area RA_NULL#n of the spatial stream #n addressed to the terminal device MS#n generates a signal of the null data with a transmission power of 0. Also, the individual pilot symbol included in the null data area generates the signal of the null pilot with the transmission power of 0.

The precoding controller 139 extracts the precoding weight information for the terminal device MS#n allocated by the terminal device allocator 107, and controls a precoding weight Vt in the subsequent beam-forming section 141 on the basis of the precoding information.

The beam-forming section 141 multiplies a signal xs in which the individual pilot signal is added to the symbol data addressed to the terminal device MS#n, which is output from the individual pilot adder 137, by the precoding weight Vt, and outputs data wjxs for the number of transmission antennas (Nt). In this example, when the number of transmission antennas is Nt, a transmission weight vector Vt is expressed by an Nt-order column vector having Nt vector elements wj. In this example, j=1, ..., Nt.

The OFDMA frame-forming section 151 maps the individual data signal addressed to the terminal device MS#n and the individual control signal addressed to the terminal device MS#n for the number of transmission antennas (Nt), which are output from the beam-forming section 141, to the subcarrier (physical resource unit PRU) within a given OFDMA frame on the basis of the resource allocation information output from the resource allocation information generator 123, and outputs the mapped signals to the IFFT sections 153.

In this example, mapping of the individual data signal to the physical resource unit PRU is mapped to the PRU on the basis of the area information on the resource allocation area [RA_START#n, RA_START#n+RA_SIZE#n] for the individual data addressed to the terminal device MS#n indicated by the LRU index including the additional data area, and allocation information (CRU). In this example, FIG. 5 illustrates an example of mapping to the PRU.

Figure 5:
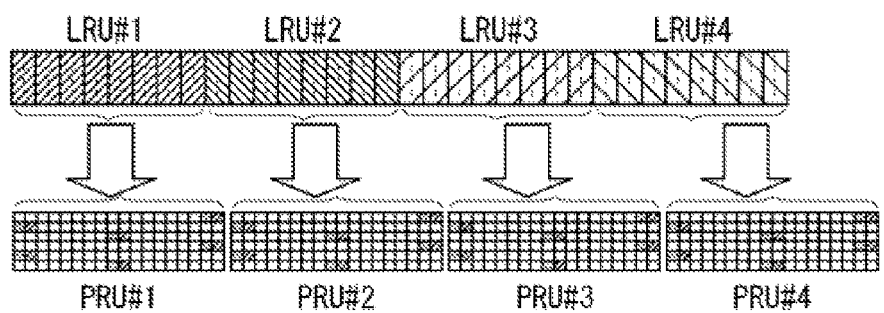
FIG. 5 is a diagram illustrating an example of mapping to a PRU.

In this embodiment, because only the continuous mapping (CRU) is dealt with as the allocation information, the OFDMA frame-forming section 151 maps each of the LRU#1 to LRU#4 to each subcarrier of the PRU#1 to LRU#4 as illustrated in FIG. 5. That is, the OFDMA frame-forming section 151 maps one LRU to the subcarrier within one PRU.

In this example, the output from the beam-forming section 141 is symbol information in which the individual pilot is added to the LRU data, and includes the pilot symbol and the data symbol included in the PRU. The symbol information is allocated to a data symbol mapping portion and a pilot mapping portion in the PRU in a given order.

Further, the OFDMA frame-forming section 151 maps the null symbol data output from the null data area signal generator 126 to the PRU on the basis of LRU index information indicated by the null data area information, which is output from the null data area setting section 113.

The individual control signal is transmitted without being formed into a beam, but in this situation, a transmission diversity technique such as a CDD, an STBC, or an SFBC is applied to enable an improvement in the reception quality.

The IFFT sections 153 performs an IFFT process on the respective outputs of the Nt OFDMA frame-forming section 151, and adds and outputs a given cyclic prefix (or guard interval).

The transmitters 155 converts a baseband signal from the IFFT sections 153 into a high frequency signal of a carrier frequency band, and outputs the high frequency signal from the base station antenna.

Figure 6:
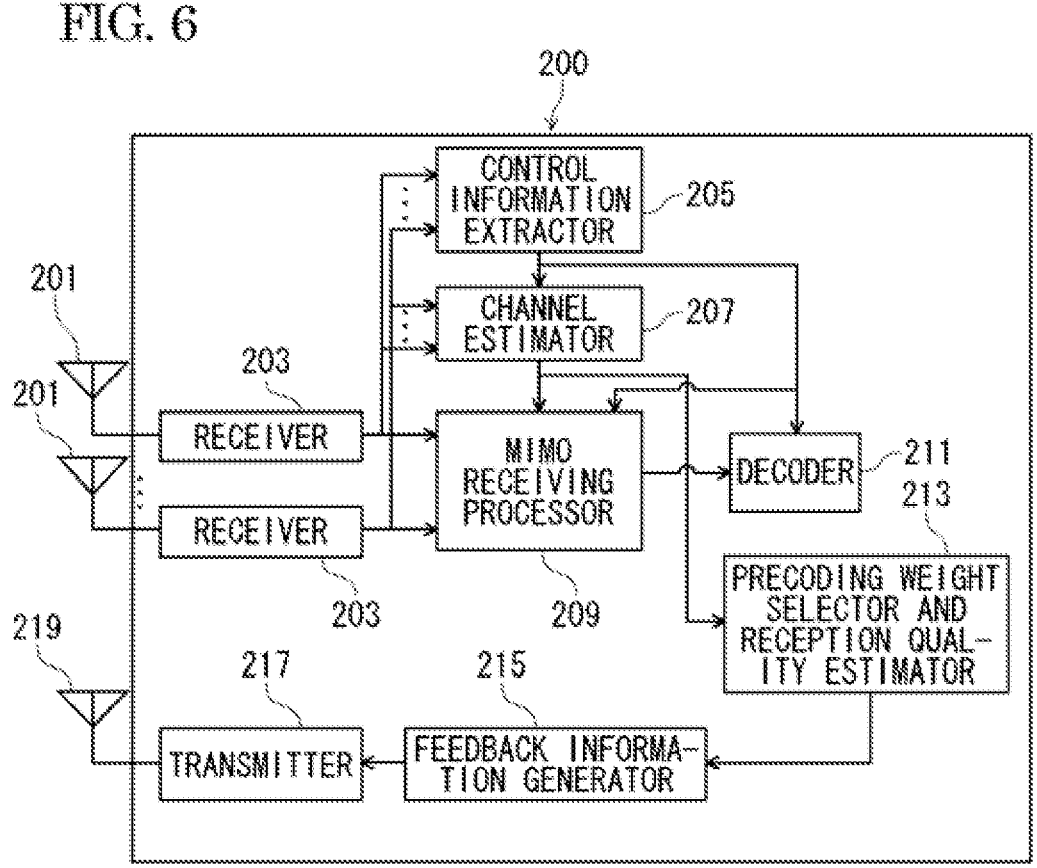
FIG. 6 is a block diagram illustrating a configuration of a terminal device 200 according to the first embodiment.

Subsequently, a description will be given of a configuration of the terminal device 200 according to the first embodiment with reference to FIG. 6. FIG. 6 is a block diagram illustrating a configuration of the terminal device 200 according to the first embodiment. The terminal device 200 illustrated in FIG. 6 includes a plurality of reception antennas 201, a plurality of receivers 203, a control information extractor 205, a channel estimator 207, an MIMO receiving processor 209, a decoder 211, a precoding weight selector and reception quality estimator 213, a feedback information generator 215, a transmitter 217, and a transmission antenna 219.

The plurality of reception antennas 201 receive the high frequency signal from the base station device 100.

The plurality of receivers 203 convert the high frequency signals received by the respective reception antennas 201 into the baseband signals. The signal processed by each of the receivers 203 is output to the control information extractor 205, the channel estimator 207, and the MIMO receiving processor.

The control information extractor 205 detects an individual control signal addressed to a own terminal device, including the individual ID information on the own terminal device from the individual control signals notified of from the base station device 100. Then, the control information extractor 205 of the terminal device 200 extracts the resource allocation information, the MCS information, and the mode information, which are control information included in the individual control signal addressed to the own terminal device. Further, when the extracted mode information is indicative of a mode for performing the multiuser MIMO transmission, the control information extractor 205 extracts stream number information and pilot sequence information.

The channel estimator 207 extracts a common pilot signal to be periodically transmitted together with the control information signal from the base station device 100, and calculates a channel estimate value.

Also, in the multiuser MIMO transmission mode, the channel estimator 207 extracts the individual pilot signal allocated by the PSI for the number of spatial streams (Mt) included in the resource to which the spatial stream is allocated, on the basis of the spatial stream information Mt and the resource allocation information, which are included in the individual control information at the time of the multiuser MIMO transmission, and performs the channel estimation of the MIMO propagation channel.

In this example, when the number of spatial streams is Mt, the channel estimator 207 extracts the individual spatial streams allocated by PSI=1 to Mt, which are included in the Mt spatial streams, and performs the channel estimation. When the number of reception antennas is Mr, a channel matrix H representative of the MIMO propagation channel includes an element h(n, m) of Mr×Mt. In this example, n=1, ..., Mr, m=1, ..., Mt, and h(n,m) represents a channel estimate value when an m-th spatial stream (that is, a spatial stream including the pilot sequence of PSI=m) is received by an n-th reception antenna.

When the individual control signal that performs the multiuser MIMO transmission, which is transmitted to the terminal device MS#n, is included in the control information extracted by the control information extractor 205, the MIMO receiving processor 209 performing the MIMO receiving process on the spatial stream that is subjected to the multiuser MIMO transmission, on the basis of the control information included in the individual control signal and a channel estimated result H from the channel estimator 207. The MIMO receiving process uses a linear receiving process using an inverse matrix of a channel matrix such as an MANSE or ZF (zero forcing) on the basis of the channel estimated result H, the pilot sequence information PSI for the spatial stream addressed to the own terminal device, and the modulation information included in the MCS information.

The decoder 211 performs a decoding process on the basis of the output of the MIMO receiving processor 209.

The precoding weight selector and reception quality estimator 213 selects a precoding weight highest in reception quality from several precoding weight candidates on the basis of the channel estimate value calculated in the channel estimator 207. Further, the precoding weight selector and reception quality estimator 213 estimates the reception quality of the selected precoding weight. Then, the precoding weight selector and reception quality estimator 213 outputs the selected precoding weight selection information and the estimated result of the reception quality to the feedback information generator 215.

The feedback information generator 215 generates a data series of a given format in order to report the output of the precoding weight selector and reception quality estimator 213 to the base station device 100 as feedback information.

The transmitter 217 transmits the data series generated by the feedback information generator 215 in order to report the data series to the base station device 100 as the feedback information.

In the terminal device 200 according to this embodiment, the reception antennas 201 and the transmission antenna 219 are dealt with as separate parts, but the same antenna may be shared. Also, a plurality of the transmission antennas 219 and a plurality of the transmitters 217 may be provided to perform directional transmission.

Figure 7:
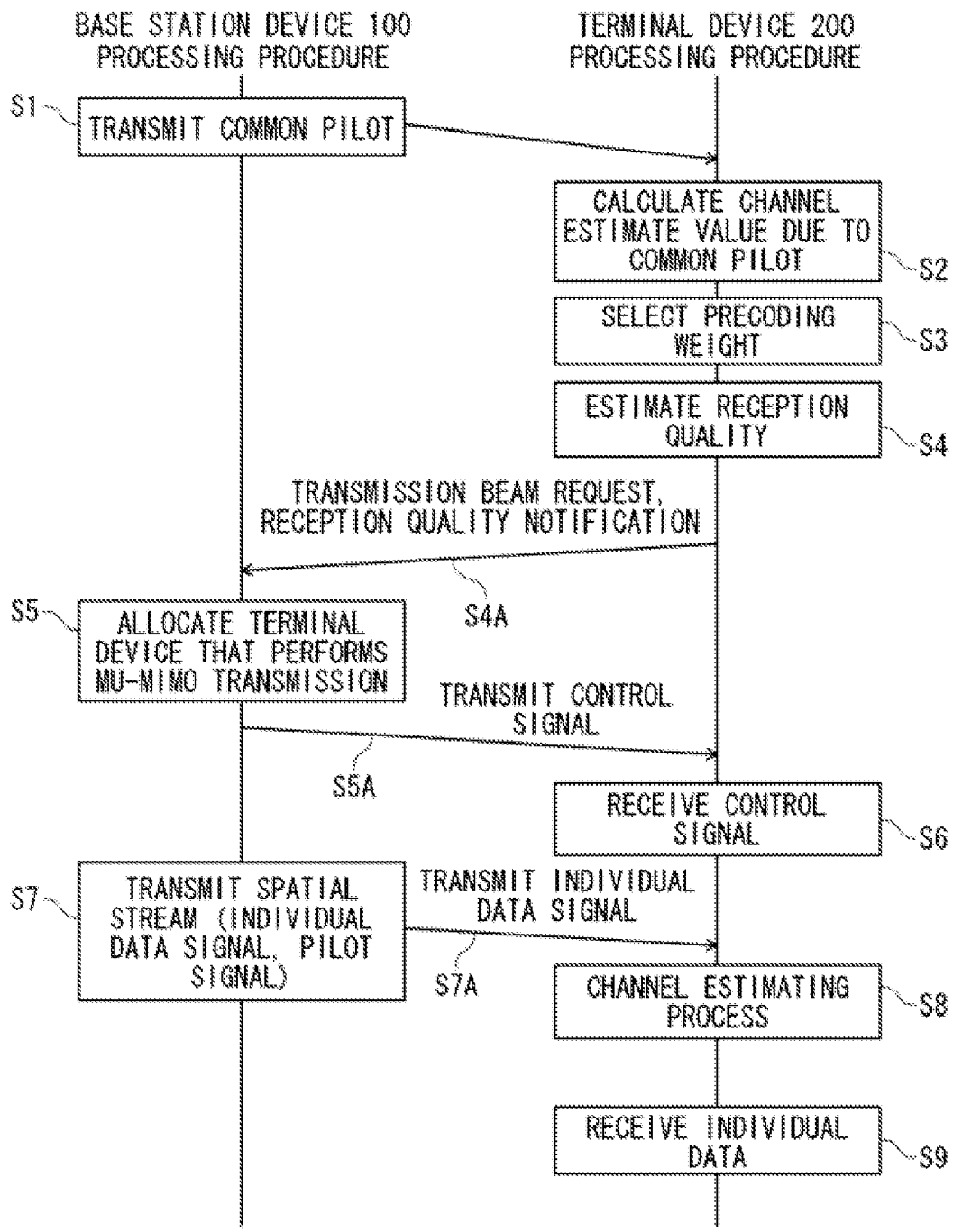
FIG. 7 is a diagram illustrating a processing procedure between a base station device 100 and the terminal device 200 according to the first embodiment.

Subsequently, a description will be given of a processing procedure between the base station device 100 and the terminal device 200 in the first embodiment with reference to FIG. 7. FIG. 7 is a diagram illustrating a processing procedure between a base station device 100 and the terminal device 200 according to the first embodiment.

In Step S1, the base station device 100 periodically transmits the pilot signal (common pilot signal) not multiplied by the precoding weight together with the control information signal.

In Step S2, the terminal device 200 extracts the common pilot signal, and calculates the channel estimate value in the channel estimator 207.

In Step S3, the terminal device 200 selects the precoding weight highest in reception quality from the several precoding weight candidates on the basis of the channel estimate value estimated in the precoding weight selector and reception quality estimator 213, and estimates the reception quality in this situation.

In Step S4, the terminal device 200 generates a data series of a given format in order to report the output of the precoding weight selector and reception quality estimator 213 to the base station device 100 as the feedback information in the feedback information generator 215.

In Step S4A, the terminal device 200 converts the baseband signal into the high frequency signal, and outputs the high frequency signal from the transmission antenna 219 in the transmitter 217.

In Step S5, the base station device 100 performs the allocation of the terminal device 200 that performs the multiuser MIMO transmission in the terminal device allocator 107. Then, in Step S5A, the base station device 100 transmits the individual control information for notifying the allocation of the terminal device 200 that performs the multiuser MIMO transmission to the terminal device 200.

In Step S6, the terminal device 200 detects the individual control signal addressed to the own terminal device in the individual control signals notified of from the base station device 100 in the control information extractor 205. Then, the terminal device 200 extracts the resource allocation information, the MCS information, and the mode information which are the control information included in the individual control information addressed to the own terminal device. When the extracted mode information is indicative of a mode for performing the multiuser MIMO transmission, the terminal device 200 further extracts the stream number information and the pilot sequence information.

In Step S7, the base station device 100 generates the individual data signals and the individual pilot signals for the number of transmission antennas (Nt).

In Step S7A, the base station device 100 transmits the individual control signal to the terminal device 200; and thereafter transmits the individual data signal.

In this example, the terminal device 200 performs processing in Steps S8 and S9 with the use of the individual control addressed to the own terminal device extracted by the control information extractor 205.

In Step S8, the terminal device 200 performs the channel estimation of the MIMO propagation channel in the channel estimator 207.

In Step S9, the terminal device 200 performs an error correction decoding process of the individual data signal received from the base station device 100 in Step S7A with the use of the code rate information on the error correcting code included in the MCS information for the spatial stream addressed to the own terminal device, and the output of the MIMO receiving processor 209 in the decoder 211.

As described above, in this embodiment, in the terminal device allocator 107 of the base station device 100, when the terminal device 200 not identical in the allocation resource size is allocated as a simultaneous multiplexing user at the time of the MU-MIMO transmission to reduce addition of scheduling so that the flexibility of the MU-MIMO allocation can be enhanced.

Also, in this embodiment, the base station device 100 transmits an additional parity bit (or repetition bit) to a part of a portion that is less than the MU-MIMO area, thereby enabling the reception quality of the user having small allocation resource to be improved.

Also, in this embodiment, the base station device 100 uses the null data area for a part of the portion that is less than the MU-MIMO area, thereby enabling the same channel interference between the spatial multiplexing streams to be reduced. As a result, the reception quality of the users other than the user having small allocation resource can be also improved.

Also, in this embodiment, the base station device 100 sets the pilot in the null data area as the null pilot, thereby enabling the reception weight reflecting that the number of spatial streams is reduced in the null data area to be generated in the terminal device 200. As a result, the reception diversity effect can be enhanced to enable a remarkable improvement in the reception quality.

From the advantages of the above-mentioned embodiment, in this embodiment, a bias of the reception quality between the spatial streams which perform the MU-MIMO is suppressed so that the overall quality of the spatial streams can be improved.

Modified Example of Base Station Device 1001

In this example, the base station device 100 according to the first embodiment has a configuration using the continuous mapping (CRU) as the resource allocation method, and uses the additional data area and the null data area, to thereby entirely improve the reception quality of the spatial streams between the terminal devices different in the resource size. However, the present invention is not limited to this configuration. In a base station device 100A according to a first modified example of the base station device 100 of the first embodiment, when the resource allocation is the continuous mapping (CRU), the transmission power is changed for each stream so that the reception quality of the entire streams that perform the MU-MIMO transmission can be improved.

Figure 8:
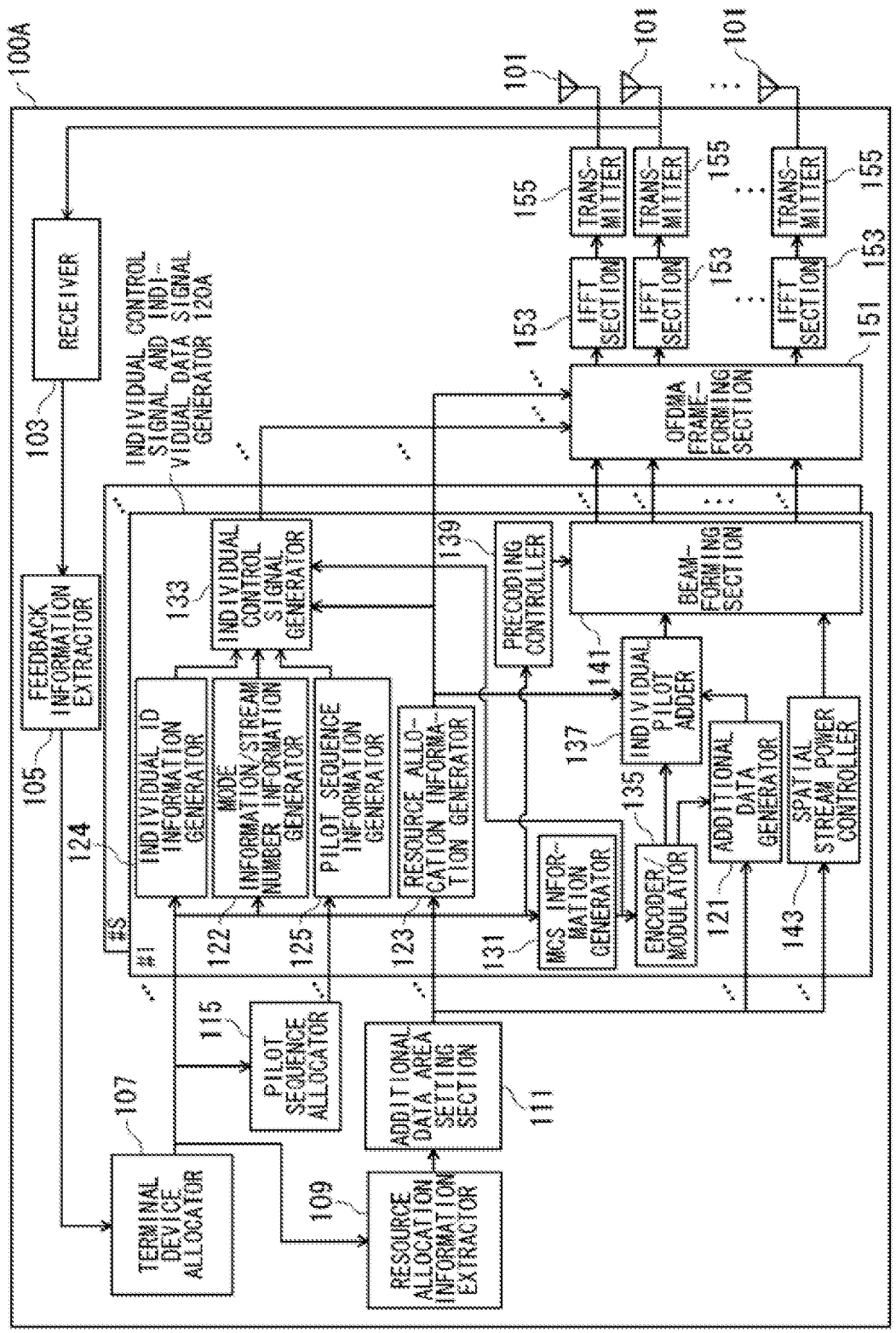
FIG. 8 is a block diagram illustrating a configuration of a base station device 100A.

Hereinafter, a configuration of the base station device 100A will be described with reference to FIG. 8. FIG. 8 is a block diagram illustrating the configuration of the base station device 100A. The base station device 100A illustrated in FIG. 8 includes the plurality of antennas 101 configuring the base station antenna, the receiver 103, the feedback information extractor 105, the terminal device allocator 107, the resource allocation information extractor 109, the additional data area setting section 111, the pilot sequence allocator 115, an individual control signal and individual data signal generator 120A, the OFDMA frame-forming section 151, the plurality of IFFT sections 153, and the plurality of transmitters 155.

Also, each of individual control signal and individual data signal generators #1 to #S configuring the individual control signal and individual data signal generator 120A includes the additional data generator 121, the mode information/stream number information generator 122, the resource allocation information generator 123, the individual ID information generator 124, the pilot sequence information generator 125, the spatial stream power controller 143, the MCS information generator 131, the individual control signal generator 133, the encoder/modulator 135, the individual pilot adder 137, the precoding controller 139, and the beam-forming section 141.

Differences of the base station device 100A illustrated in FIG. 8 from the base station device 100 according to the first embodiment illustrated in FIG. 1 reside in that the additional data area setting section 111 is replaced with an additional data area setting section 111A, and the null data area setting section 113 and the null data area signal generator 126 are replaced with the spatial stream power controller 143 provided in the individual control signal and individual data signal generator 120A. The other configurations are common to those in the base station device 100, and the common configurations are denoted by identical reference symbols, and their detailed description will be omitted.

In the base station device 100A, instead of the use of the null data area, the spatial stream power controller 143 makes the transmission power between the spatial streams variable so that the reception quality of the spatial streams between the terminal devices different in the resource size can be entirely improved.

Hereinafter, a description will be given of a configuration of the base station device 100A different from the base station device 100 according to the first embodiment illustrated in FIG. 1.

When the RA_SIZE#1 to #S included in the resource allocation information RA#1 to #S are different from each other (further, including a case in which RA_START#1 to #S are different from each other even when RA_SIZE#1 to #S are identical with each other), the additional data area setting section 111A detects an area including a minimum value and a maximum value of the indexes of the LRU used for allocation to the terminal devices MS#1 to #S that perform the MU-MIMO transmission as the MU-MIMO area from RA_START#1 to #S and RA_SIZE#1 to #S information. That is, the MU-MEMO area is defined by the following Expression (2).

[Expression 2]

$$\left[\min_{1 \leq n \leq S}(RA\_START\#n), \max_{1 \leq n \leq S}(RA\_START\#n + RA\_SIZE\#n)\right] \quad (2)$$

Further, the additional data area setting section 111A sets the additional data area for transmitting the additional data with the use of all of the resources in the resource area (hereinafter called "unfilled resource area RA_UNFILLED#n") where the resource allocation area [RA_START#n, RA_START#n+RA_SIZE#n] for the terminal device MS#n (n=1 to S in this example) is less than the MU-MIMO area.

Then, the additional data area setting section outputs the additional data area setting information set as described above, the area information on the resource allocation area [RA_START#1 to #n, RA_START#n+RA_SIZE#n] for the terminal device MS#n including the additional data area, and the allocation information RA_PLACEMENT (CRU) to the additional data generator 121, the resource allocation information generator 123, and the spatial stream power controller 143.

The spatial stream power controller 143 controls the transmission power of the spatial streams on the basis of the setting status of the additional data area. That is, because the additional data area is set for the spatial streams of the terminal device in which the resource size is smaller than the MU-MIMO area, an improvement of the reception quality due to the additional data is estimated to control the transmission power to be reduced. On the other hand, the spatial stream power controller 143 performs a control for increasing the transmission power for the spatial streams of the terminal device in which the resource size is identical with or substantially equal to the MU-MIMO area.

Figure 9:
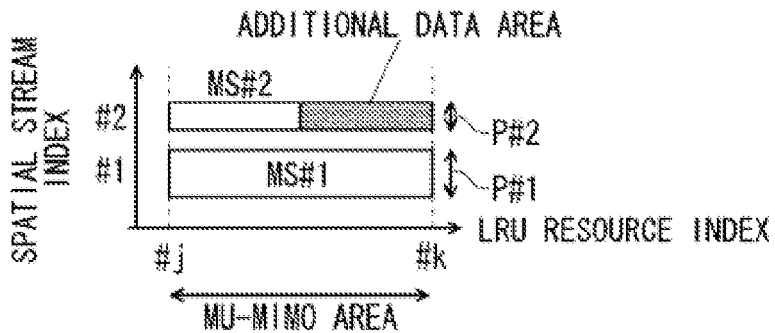
FIG. 9 is a schematic diagram illustrating a transmission power control example (1) of a spatial stream power controller 143.
Figure 10:
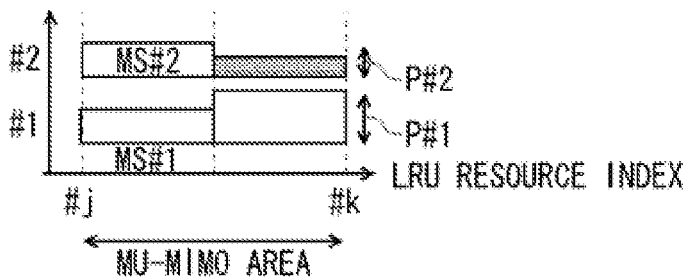
FIG. 10 is a schematic diagram illustrating a transmission power control example (2) of the spatial stream power controller 143.

A description will be given of an example of the transmission power control of the entire MU-MIMO area by the spatial stream power controller 143 with reference to FIGS. 9 and 10. FIG. 9 is a diagram schematically illustrating a transmission power control example (1) of the spatial stream power controller 143, and FIG. 10 is a diagram schematically illustrating a transmission power control example (2) of the spatial stream power controller 143. The axis of ordinate in FIGS. 9 and 10 represents the indexes of the spatial streams, and the axis of abscissa in FIGS. 9 and 10 represents a release index (LRU index expression) of the LRU basis.

Also, hatched blocks in the figures represent the additional data areas. Also, ranges of both arrows indicated at the right of the axis of ordinate in FIGS. 9 and 10 schematically represent magnitudes P#1 and P#2 of the transmission powers for the respective indexes #1 and #2 of the spatial streams. That is, as the spatial streams are larger in the ranges of both the arrows indicated at the right of the axis of ordinate in FIGS. 9 and 10, the transmission powers are larger.

As illustrated in FIG. 8, the spatial stream power controller 143 performs a control for increasing the transmission power P#1 on the spatial stream of the terminal device MS#1 in which the resource size is substantially equal to the MU-MIMO area.

Also, as illustrated in FIG. 9, because the additional data area is set for the spatial stream of the terminal device MS#2 in which the resource size is smaller than the MU-MEMO area, an improvement in the reception quality due to the additional data is estimated. Then, the transmission power is reduced for the LRU including the additional data area to set the transmission power P#2.

As illustrated in FIGS. 8 and 9, the transmission power control of the entire MU-MIMO area is performed on the LRU basis while the individual pilot signal and the transmission powers of the individual data are kept equal to each other or at a predetermined power ratio. As a result, the data can be demodulated without providing an additional control signal.

As described above, in the base station device 100A according to the modified example of the first embodiment, (1) the user stream small in the resource size uses the additional data area, and the transmission power is reduced, whereby (2) the transmission power is increased and distributed as large as the reduced transmission power with respect to the stream of another user, to thereby enable the reception quality to be improved.

Second Embodiment

The first embodiment is described in a case where a decision is made that the terminal device allocator 107 of the base station device 100 uses only the continuous mapping (CRU) as the allocation method (RA_PLACEMENT). However, in the first embodiment, when the distributed mapping (DRU) is also used as the allocation method (RA_PLACEMENT), the LRU in the null data area is distributed in a plurality of PRUs. For that reason, when it is assumed that the pilot signal in the null data area is the null pilot signal, data out of the null data area is included in the PRU, and the channel estimate precision in modulating the data may be degraded.

Figure 11:
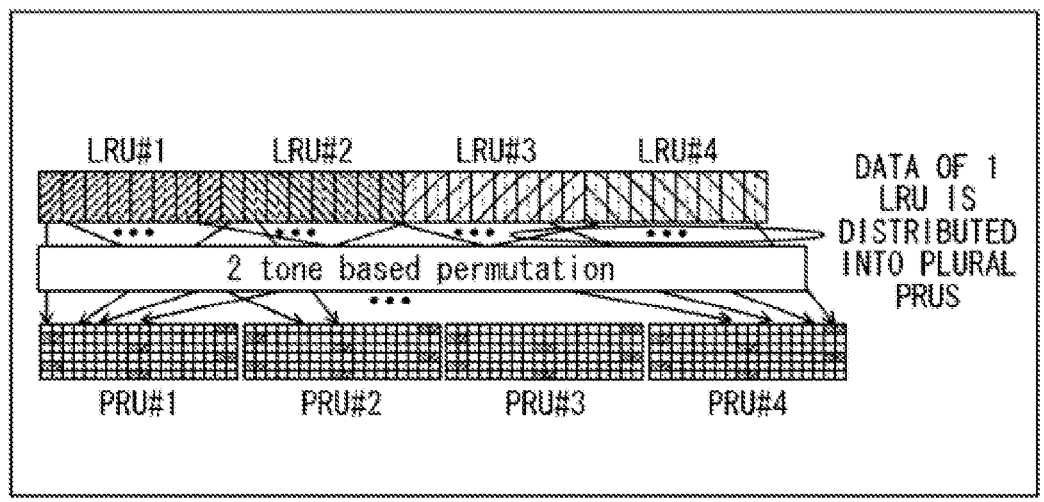
FIG. 11 is a diagram schematically illustrating a resource allocation status in a two-user MU-MIMO mode according to the first embodiment.

FIG. 11 illustrates an appearance in which when LRU#4 is the null data area, the LRU#4 is distributed into a plurality of PRU#1 to #4 as the PRU. As illustrated in FIG. 11, the LRU#4 of the null data area is distributed into the plurality of PRU#1 to #4 as the PRU by a subcarrier interleaver (or tone permutation). Because the pilot signal is used for modulation of data out of the null data area, there is a need to transmit the pilot signal in the null data area as usual. However, when the CRU is used, the pilot signal in the null data area is set as the null pilot signal, as a result of which not only the same channel interference between the spatial multiplexing streams is reduced, but also the effect of improving the remarkable reception quality can be obtained by enhancing the reception diversity effect.

In order to prevent the channel estimation precision from being degraded when the distributed mapping (DRU) is used as the allocation method (RA_PLACEMENT), a base station device 300 according to the second embodiment newly includes, in addition to the configuration of the base station device 100 according to the first embodiment, a resource allocation method detector 301 that detects whether the resource allocation is the distributed mapping or the continuous mapping according to the resource allocation information, and a pilot transmission controller 302 that controls a pilot transmitting method to set the pilot signal in the null data area setting section 113 to the null pilot or the normal pilot transmission on the basis of the detection result of the resource allocation method detector.

Figure 12:
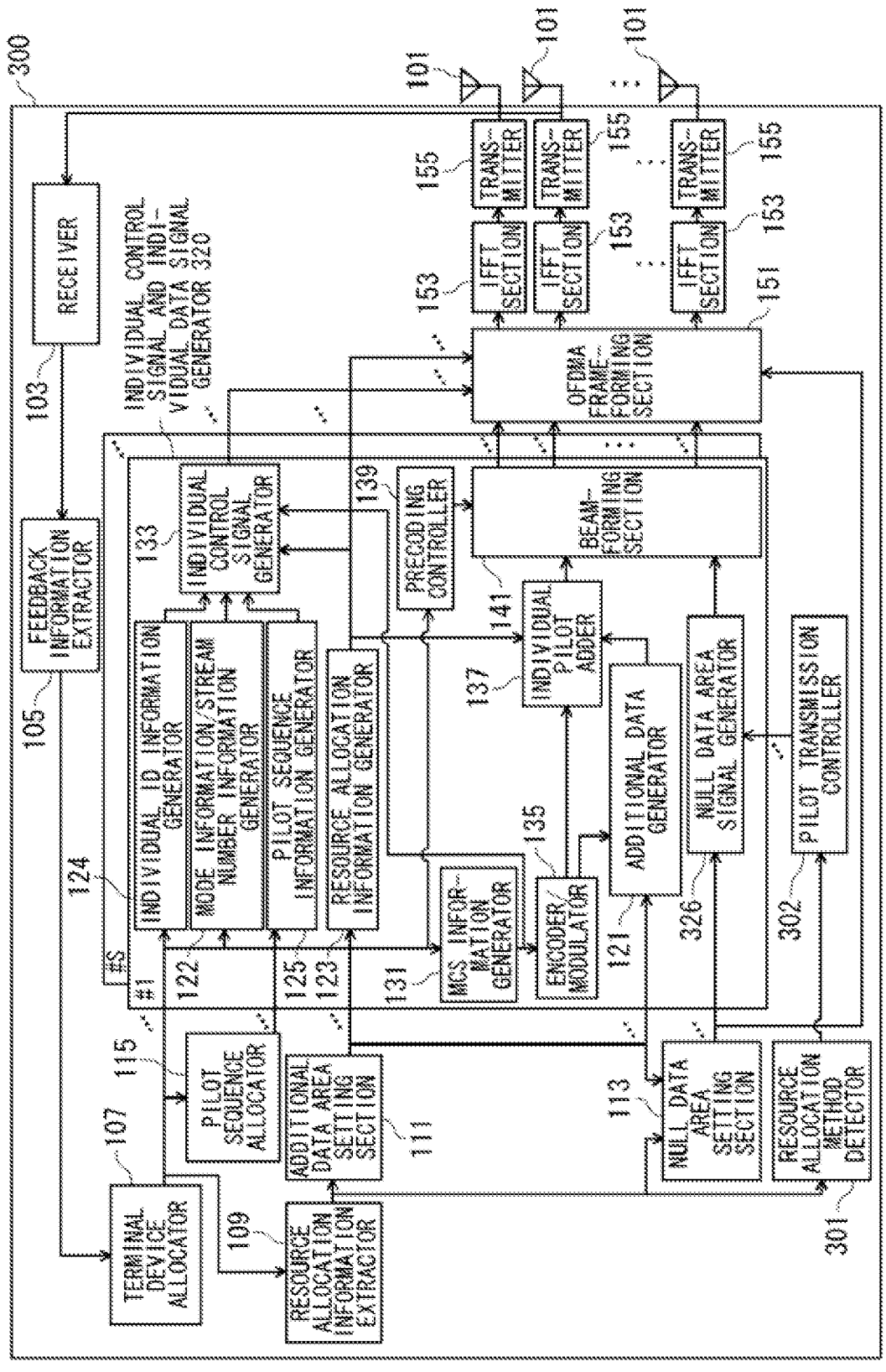
FIG. 12 is a block diagram illustrating a configuration of a base station device 300 according to a second embodiment.

FIG. 12 illustrates a configuration of the base station device 300 according to this embodiment. FIG. 12 is a block diagram illustrating a configuration of the base station device 300 according to the second embodiment. The base station device 300 illustrated in FIG. 12 includes the plurality of antennas 101 configuring the base station antenna, the receiver 103, the feedback information extractor 105, the terminal device allocator 107, the resource allocation information extractor 109, the additional data area setting section 111, the null data area setting section 113, the resource allocation method detector 301, the pilot transmission controller 302, an individual control signal and individual data signal generator 320, the OFDMA frame-forming section 151, the IFFT sections 153, and the plurality of transmitters 155.

Differences of the base station device 300 illustrated in FIG. 12 from the base station device 300 according to the first embodiment illustrated in FIG. 1 reside in that the resource allocation method detector 301 and the pilot transmission controller 302 are additionally provided, and the individual control signal and individual data signal generator 120 is replaced with the individual control signal and individual data signal generator 320. Configurations common to those in the first embodiment are denoted by identical reference symbols, and their detailed description will be omitted.

Also, a difference of the individual control signal and individual data signal generator 320 illustrated in FIG. 12 from the individual control signal and individual data signal generator 120 illustrated in FIG. 1 resides in that the null data area signal generator 126 is replaced with a null data area signal generator 326 different in the operation from the null data area signal generator 126. Configurations common to those in the first embodiment are denoted by identical reference symbols, and their detailed description will be omitted.

The resource allocation method detector 301 further extracts only RA_PLACEMENT (CRU/DRU) from the resource allocation information RA#1 to #S (that is, including RA_SIZE#1 to #S, RA_START#1 to #S, RA_PLACEMENT (CRU/DRU)) extracted from the resource allocation information extractor 109. The resource allocation method detector 301 then detects whether the resource allocation is the distributed mapping (DRU) or the continuous mapping (CRU).

The pilot transmission controller 302 controls the pilot transmitting method to set the pilot signal in the null data area signal generator 326 to the null pilot or the normal pilot transmission.

That is, when it is detected by the resource allocation method detector 301 that the resource allocation is the continuous mapping (CRU), the pilot transmission controller 302 controls the pilot transmitting method to set the pilot signal in the null data area signal generator 326 to the null pilot. The null pilot is a pilot signal in which the transmission power of the pilot signal is 0. In other words, when the resource allocation is the continuous mapping (CRU), the pilot signal in the null data area is not transmitted.

Further, when it is detected by the resource allocation method detector 301 that the resource allocation is the distributed mapping (DRU), the pilot transmission controller 302 controls the pilot transmitting method to set the pilot signal in the null data area signal generator 326 to the normal pilot transmission. In other words, when the resource allocation is the distributed mapping (DRU), the base station device 300 transmits the normal pilot signal in the null data area.

The null data area signal generator 326 generates the signal of the null data area on the basis of information on the null data area RA_NULL#n for the terminal device MS#n (n=1 to S). That is, the null data area signal generator 326 generates the symbol data of the LRU included in the null data area RA_NULL#n of the spatial stream #n addressed to the terminal device MS#n as a signal of the null data in which the transmission power is 0. Also, the null data area signal generator 326 generates the individual pilot symbol included in the null data area as the pilot signal on the basis of the control information of the pilot transmission controller 302.

As described above, in this embodiment, the base station device 300 can control the pilot transmitting method in the null data area on the basis of the resource allocation method. For that reason, the base station device 300 can suppress the degradation of the reception characteristic due to the degradation of the channel estimation precision in the terminal device. Further, the use of the additional data area improves the quality of the spatial stream, and also the use of the null data area reduces the interference of the spatial stream addressed to another user. This can enhance the reception quality of all the spatial multiplexing streams that perform the MU-MIMO transmission in the terminal device.

Third Embodiment

In the second embodiment, a description is given of a case in which the continuous mapping (CRU) and the distributed mapping (DRU) are used as the resource allocation method. However, when the base station device 300 according to the second embodiment is applied to the terminal device to which the MLD receiving system is applied in order to enhance the MIMO reception quality, there arises the following problems.

Figure 13:
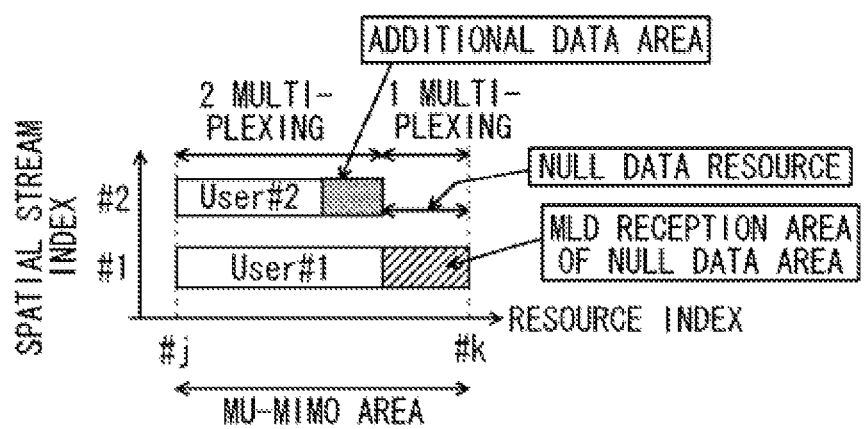
FIG. 13 is a diagram schematically illustrating a resource allocation status in the two-user MU-MIMO mode according to the second embodiment.

The base station device 300 transmits only the pilot signal without transmitting data in the null data area. In this example, the terminal device that includes data addressed to the own terminal device in the null data area performs the MLD reception including the null data area. In this case, the pilot signal in the null data area is transmitted by not the null pilot but the normal transmission power. However, because data to be transmitted is the null data, the terminal device that performs the MLD reception generates an erroneous reception replica, and largely degrades the reception characteristic in the MLD receiving process. FIG. 13 schematically illustrates the resource allocation status in a two-user MU-MIMO mode. The axis of ordinate in FIG. 13 represents an index of the spatial streams, and the axis of abscissa in FIG. 13 represents a resource index (LRU index expression) of an LRU basis. Also, blocks hatched in the figure represent the additional data area, and areas not blocked which are indicated by arrows in the MU-MIMO area represent the null data areas. Also, it is assumed that the terminal device MS#1 is the MLD reception compliant terminal device.

In the resource allocation status illustrated in FIG. 13, when the resource allocation is the distributed mapping (DRU), the pilot signal in the null data area of the terminal device MS#2 is transmitted by not the null pilot but the normal transmission power. However, because data to be transmitted is the null data, the terminal device #1 that performs the MLD reception generates an erroneous reception replica, and erroneously generates the replica at the time of the MLD reception during the MLD receiving process. For that reason, the reception characteristic is largely degraded. On the other hand, in the case of the continuous mapping (CRU), in order that the null pilot signal is transmitted together with the null data in the null data area of the terminal device MS#2, even if the terminal device MS#1 performs the MLD reception, the characteristic is not degraded. Conversely, because the number of replica candidates is reduced, the characteristic of the MLD reception is improved.

In the third embodiment, a description will be given of a configuration of a base station device 500 and a configuration of a terminal device 600 for suppressing the degradation of the MLD reception characteristic at the terminal device that performs the MLD reception.

Figure 14:
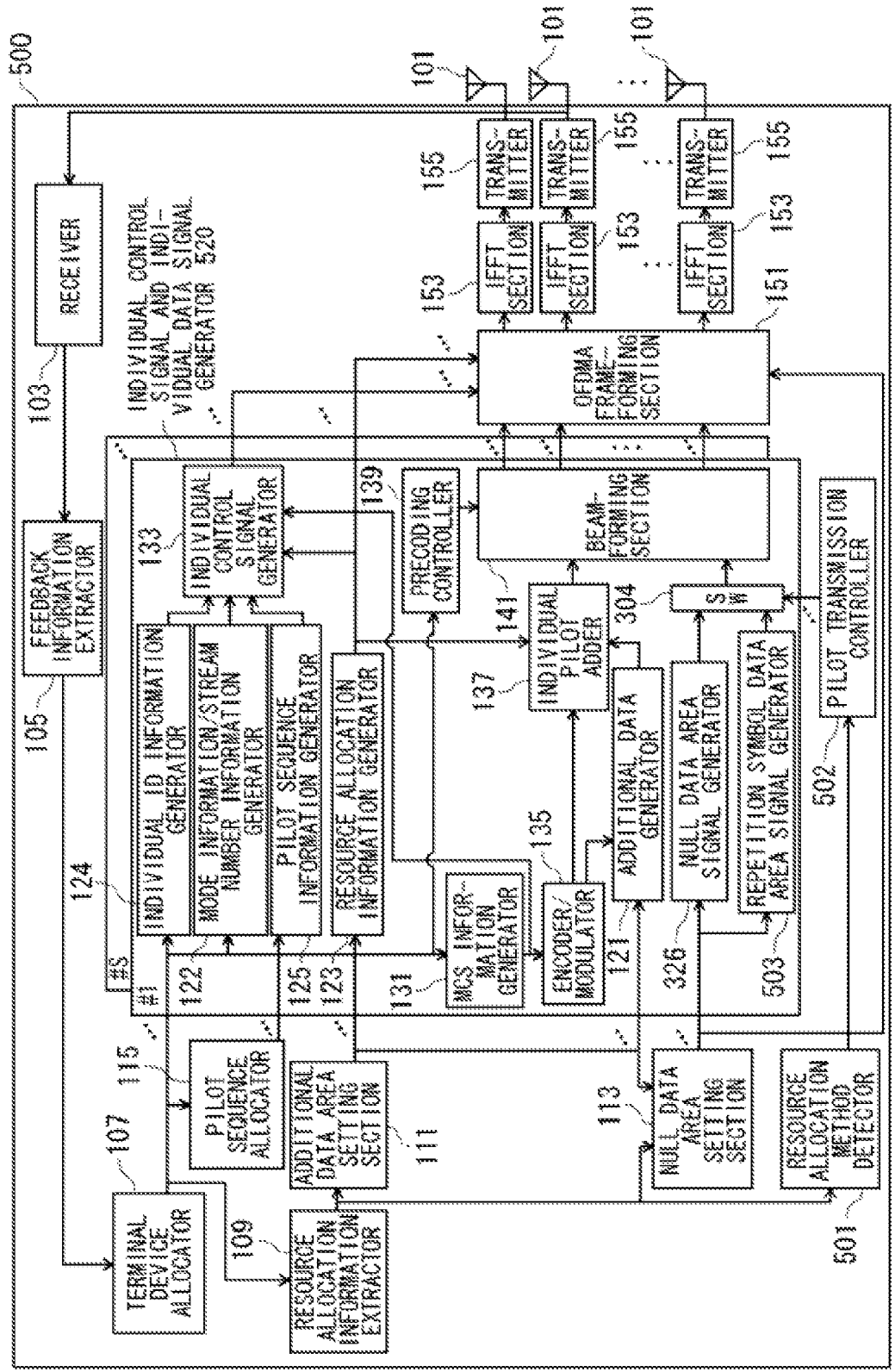
FIG. 14 is a block diagram illustrating a configuration of a base station device 500 according to a third embodiment.

FIG. 14 is a block diagram illustrating the configuration of the base station device 500 according to the third embodiment. The base station device 500 illustrated in FIG. 14 includes the receiver 103, the feedback information extractor 105, the terminal device allocator 107, the resource allocation information extractor 109, the additional data area setting section 111, the null data area setting section 113, a repetition symbol data area signal generator 503, an individual control signal and individual data signal generator 520, the OFDMA frame-forming section 151, the plurality of IFFT sections 153, and the plurality of transmitters 155.

Differences of the base station device 500 illustrated in FIG. 14 from the base station device 300 illustrated in FIG. 12 reside in that the repetition symbol data area signal generator 503 is newly provided in addition to the configuration of the base station device 300 according to the second embodiment, the pilot transmission controller 302 is replaced with a data transmission controller 502, and the resource allocation method detector 301 is replaced with a resource allocation method detector 501. The other configurations are identical with those in the second embodiment, and in FIG. 4, components common to those in FIG. 12 are denoted by identical reference symbols.

The repetition symbol data area signal generator 503 generates a signal of the known repetition symbol data area on the basis of the information on the null data area RA_NULL#n for the terminal device MS#n (1=1 to S in this example). That is, the symbol data of the LRU included in the null data area RA_NULL#n of the spatial stream #n addressed to the terminal device MS#n generates a signal of the symbol data using the same modulation system as that of the additional data area on the LRU basis.

Figure 15:
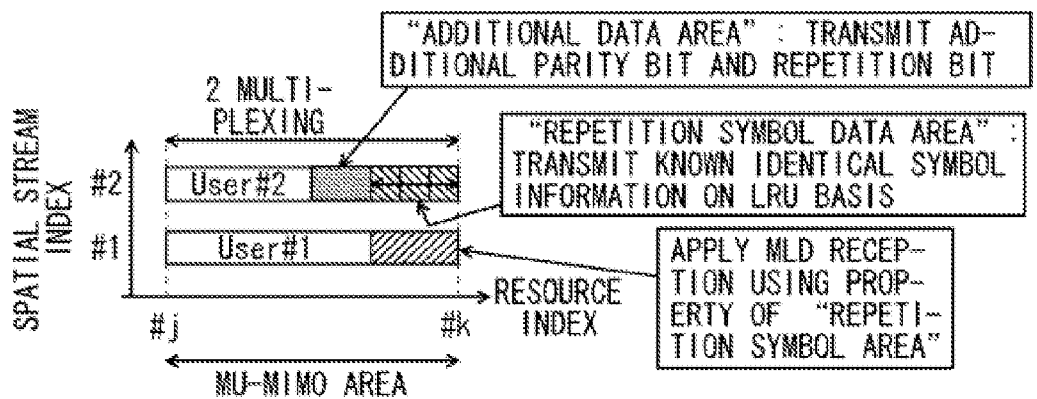
FIG. 15 is a diagram schematically illustrating a resource allocation status including a repetitive symbol data area in the two-user MU-MIMO mode according to the third embodiment.

Also, the individual pilot symbol included in the repetition symbol data area generates the normal pilot signal. FIG. 15 schematically illustrates the resource allocation status including the repetition symbol data area in the two-user MU-MIMO mode. The axis of ordinate in FIG. 15 represents an index of the spatial streams, and the axis of abscissa in FIG. 15 represents a resource index (LRU index expression) of the LRU basis. Also, blocks hatched in the figure represent the additional data area, and areas not blocked which are indicated by arrows in the MU-MIMO area represent the null data areas. Also, it is assumed that the terminal device MS#1 is the MLD reception compliant terminal device.

As illustrated in FIG. 15, in the spatial stream addressed to the terminal device MS#2, the signal of the symbol data using the same modulation system as that of the additional data area on the LRU basis is generated in the known repetition symbol data area.

The data transmission controller 502 is configured to switch between an output of the null data area signal generator 326 and an output of the repetition symbol data area signal generator 503 through a switch 304 on the basis of the detection result of the resource allocation method detector 301, and output a selected output to the beam-forming section. That is, the data transmission controller 502 controls the pilot transmitting method to set the pilot signal in the null data area signal generator 326 to the null pilot or the normal pilot transmission on the basis of the detection result of the resource allocation method detector 301.

When the resource allocation is the continuous mapping (CRU), the data transmission controller 502 controls an output of the null data area signal generator 326 to be input to the individual control signal and individual data signal generator 520. On the other hand, when the resource allocation is the distributed mapping (DRU), the data transmission controller 502 controls an output of the repetition symbol data area signal generator 503 to be input to the individual control signal and individual data signal generator 520.

Figure 16:
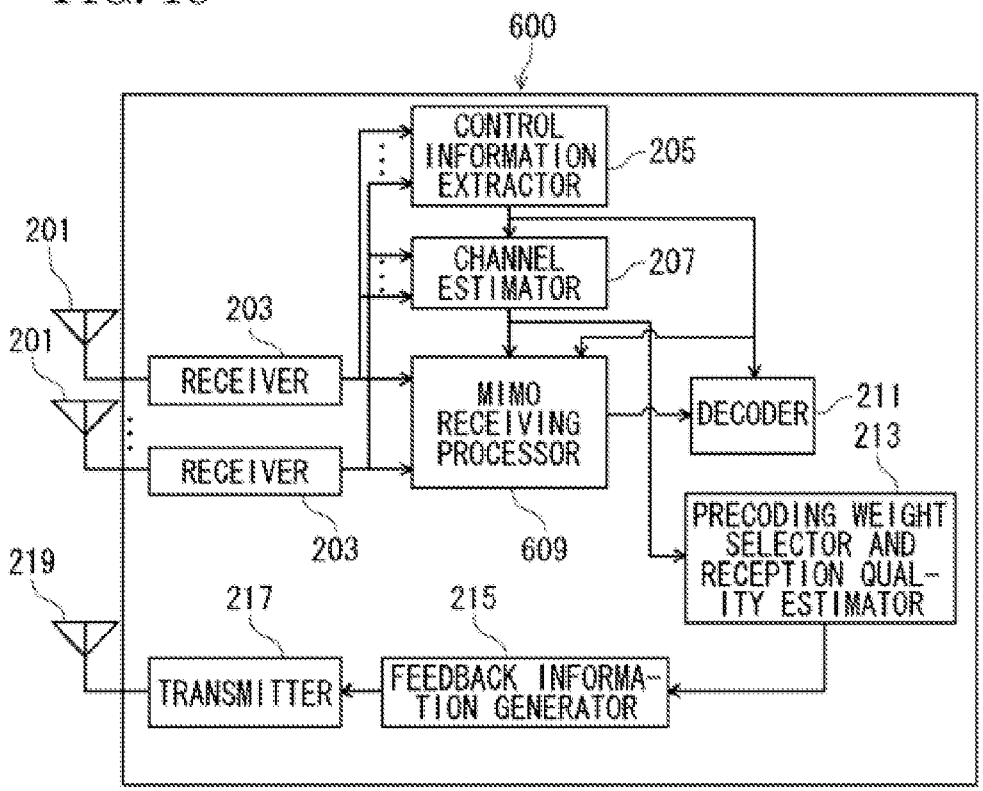
FIG. 16 is a block diagram illustrating a configuration of a terminal device 600 according to the third embodiment.

Subsequently, a description will be given of a configuration of the terminal device 600 according to the third embodiment with reference to FIG. 16. FIG. 16 is a block diagram illustrating the configuration of the terminal device 600 according to the third embodiment. The terminal device 600 illustrated in FIG. 16 includes the plurality of reception antennas 201, the plurality of receivers 203, the control information extractor 205, the channel estimator 207, the MIMO receiving processor 609, the decoder 211, the precoding weight selector and reception quality estimator 213, the feedback information generator 215, the transmitter 217, and the transmission antenna 219. A difference of the terminal device 600 illustrated in FIG. 16 from the terminal device 200 according to the first embodiment illustrated in FIG. 6 resides in the MIMO receiving processor 609, and the other configurations are identical with those of the terminal device 200. Configurations common to those in the first embodiment are denoted by identical reference symbols, and their detailed description will be omitted.

Figure 17:
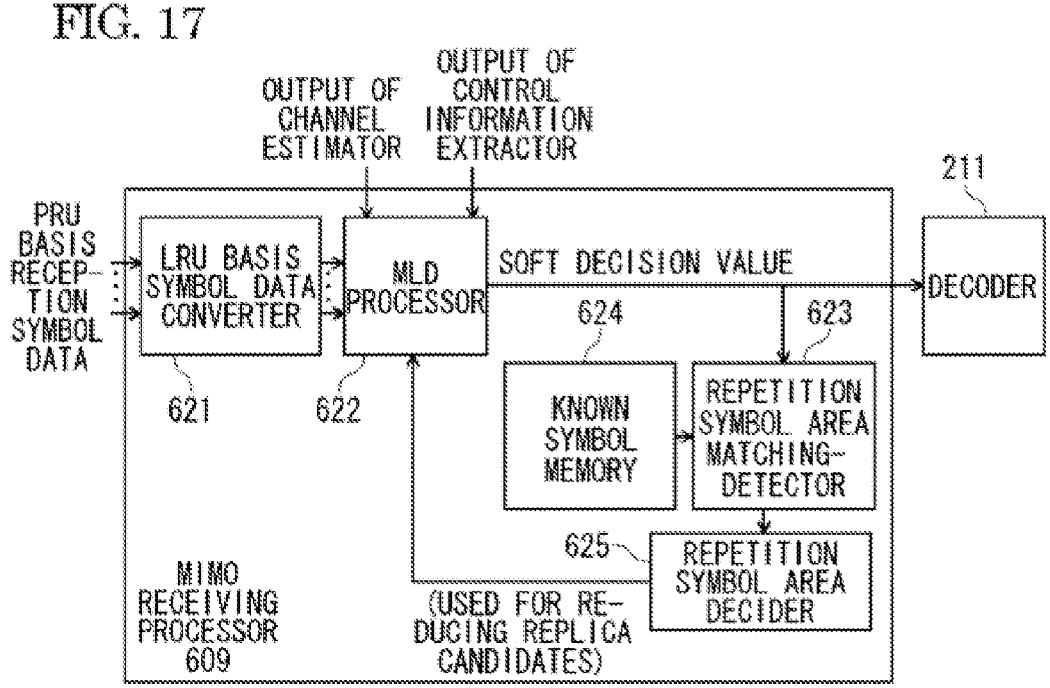
FIG. 17 is a block diagram illustrating a configuration of an MIMO receiving processor 609.

The terminal device 600 according to this embodiment can improve the MLD reception quality during the MLD receiving process in the repetition symbol data area through the processing of the MIMO receiving processor 609. Hereinafter, a configuration of the MIMO receiving processor 609 will be described in detail with reference to FIG. 17. FIG. 17 is a block diagram illustrating a configuration of the MIMO receiving processor 609. The MIMO receiving processor 609 illustrated in FIG. 17 includes an LRU basis symbol data converter 621, an MLD processor 622, a repetition symbol area matching-detector 623, a known symbol memory 624, and a repetition symbol area decider 625.

The LRU basis symbol data converter 621 permutates data of the PRU basis into data of the LRU basis on the basis of output data of the receivers 203 for each of the reception antennas 201, and outputs data of the LRU basis to the MLD processor 622.

The MLD processor 622 performs MLD processing on the basis of a channel matrix H that is an output from the channel estimator 207, the pilot sequence information PSI for the spatial stream addressed to the own terminal device or another terminal device, which is an output from the control information extractor 205, and the modulation information included in the MCS information. The MLD receiving process may use, for example, a technique disclosed in Non-patent Literature 4. Then, the MLD processor 622 outputs a soft decision value of the LRU basis of all the spatial streams to be subjected to the multiuser transmission to the decoder 211 and the repetition symbol area matching-detector 623.

The known symbol memory 624 stores the known repetition symbol in a given period. The repetition symbol is output to the repetition symbol area matching-detector 623.

The repetition symbol area matching-detector 623 converts the soft decision value output from the MLD processor 622 into a hard decision value. Then, the repetition symbol area matching-detector 623 detects a consistency of the hard decision value and the output from the known symbol memory 624. Then, the repetition symbol area matching-detector 623 outputs the detection result to the repetition symbol area decider 625.

When the repetition symbol area matching-detector 623 detects that the consistence of the hard decision value and the output from the known symbol memory 624 is a given value or more, the repetition symbol area decider 625 outputs the decision result to the MLD processor 622 as the null symbol area.

When the repletion symbol area is included in a part (Yk) of the spatial streams (Y1, Y2, . . . , Ys), the MLD processor 622 generates a replica in which the symbol of Yk is decided at the time of generating the replica in the MLD processor 622 on the basis of the decision result from the repetition symbol area decider 625, and performs the MLD processing for estimating the symbol of the remaining undecided spatial streams with the use of the maximum likelihood estimation standard.

The terminal device 600 according to the third embodiment can improve the MLD reception characteristic by reducing the number of reception candidates through the above-mentioned MLD receiving process.

As described above, in this embodiment, when the user not identical in the allocation resource size is allocated to the multiuser MIMO user, the base station device 500 sets, (1) when the resource allocation is the continuous mapping (CRU), the additional data area for transmitting the additional parity bit (or repetition bit), and the remaining area as the null data areas with respect, to a part of a portion that is less than the MU-MIMO area through the spatial stream of the user in which the allocation resource size is less than the MU-MIMO area, and sets, (2) when the resource allocation is the distributed mapping (DRU), "additional data area" for transmitting the additional parity bit (or repetition bit), and "repetition symbol area" for transmitting the known identical symbol on the LRU basis, on the LRU basis, respectively. As a result, even if the resource allocation is any one of the continuous mapping (CRU) and the distributed mapping (DRU), the reception characteristic is prevented from being largely degraded by generation of the erroneous reception replica during the AMLD receiving process. Further, the user of the additional data area improves the quality of the spatial stream. Also, the null data area is used when the resource allocation is the continuous mapping, or the repetition symbol area is used when the resource allocation is the distributed mapping. As a result, with application of the MLD receiving method that reduces the interference of the spatial stream addressed to another user or reduces the reception replica, the reception quality of all the spatial multiplexing streams that perform the MU-MIMO transmission in the terminal device can be enhanced. Hence, the reception quality of all the spatial multiplexing streams that perform the MU-MIMO transmission in the terminal device 600 can be enhanced.

Further, in this embodiment, in the terminal device allocator 107 of the base station device 500, the base station device 500 not identical in the allocation resource size is allocated as the simultaneous multiplexing user during the MU-MIMO transmission, thereby being capable of reducing a load of scheduling, and enhancing the flexibility of the MU-MIMO allocation.

Also, in this embodiment, the base station device 500 transmits the additional parity bit (or the repetition bit) to a part of a portion that is less than the MU-MIMO area, thereby enabling the reception quality of the user having small allocation resource to be improved.

Also, in this embodiment, when the resource allocation is the continuous mapping (CRU), the base station device 500 uses the null data area for the spatial multiplexing stream, thereby enabling the same channel interference between the spatial multiplexing streams to be reduced.

Also, in this embodiment, when the resource allocation is the continuous mapping (CRU), the base station device 500 sets the pilot of the null data area as the null pilot so that the reception diversity effect can be enhanced in the terminal device 600, to enable a remarkable improvement in the reception quality.

Also, in this embodiment, when the resource allocation is the continuous mapping (CRU), the base station device 500 can control the pilot transmitting method in the null data area on the basis of the resource allocation method. For that reason, the degradation of the reception characteristic attributable to the degradation of the channel estimation precision in the terminal device 600 can be suppressed.

First Modified Example of Terminal Device 600

In the third embodiment, in the base station device 500, instead of the null data area used in the first embodiment or the second embodiment, there is used a transmitting method in which transmission using the repetition symbol data area is performed to enable an improvement in the reception quality even in the terminal device 600 that performs the MLD reception. However, the present invention is not limited to this configuration. A configuration and operation of a terminal device 600A that is a modified example of the terminal device 600 according to the third embodiment will be described below. In the terminal device 600A, processing to be described later is added to the normal MLD receiving process so that the null data area used in the first embodiment or the second embodiment can be applied as it is.

A difference of the terminal device 600A from the terminal device 600 according to the third embodiment illustrated in FIG. 16 resides in that the MIMO receiving processor 609 is replaced with a MIMO receiving processor 609A. The other configurations are common to those of the terminal device 600, and therefore their detailed description will be omitted.

Figure 18:
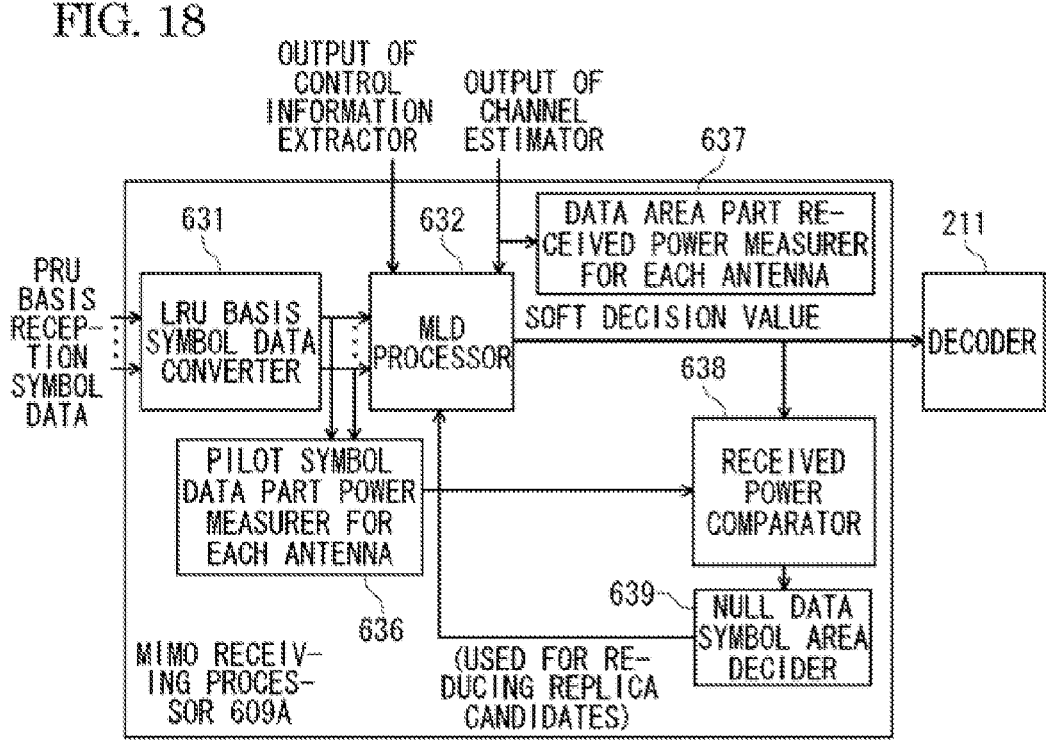
FIG. 18 is a block diagram illustrating a configuration of an MIMO receiving processor 609A.
Figure 23:
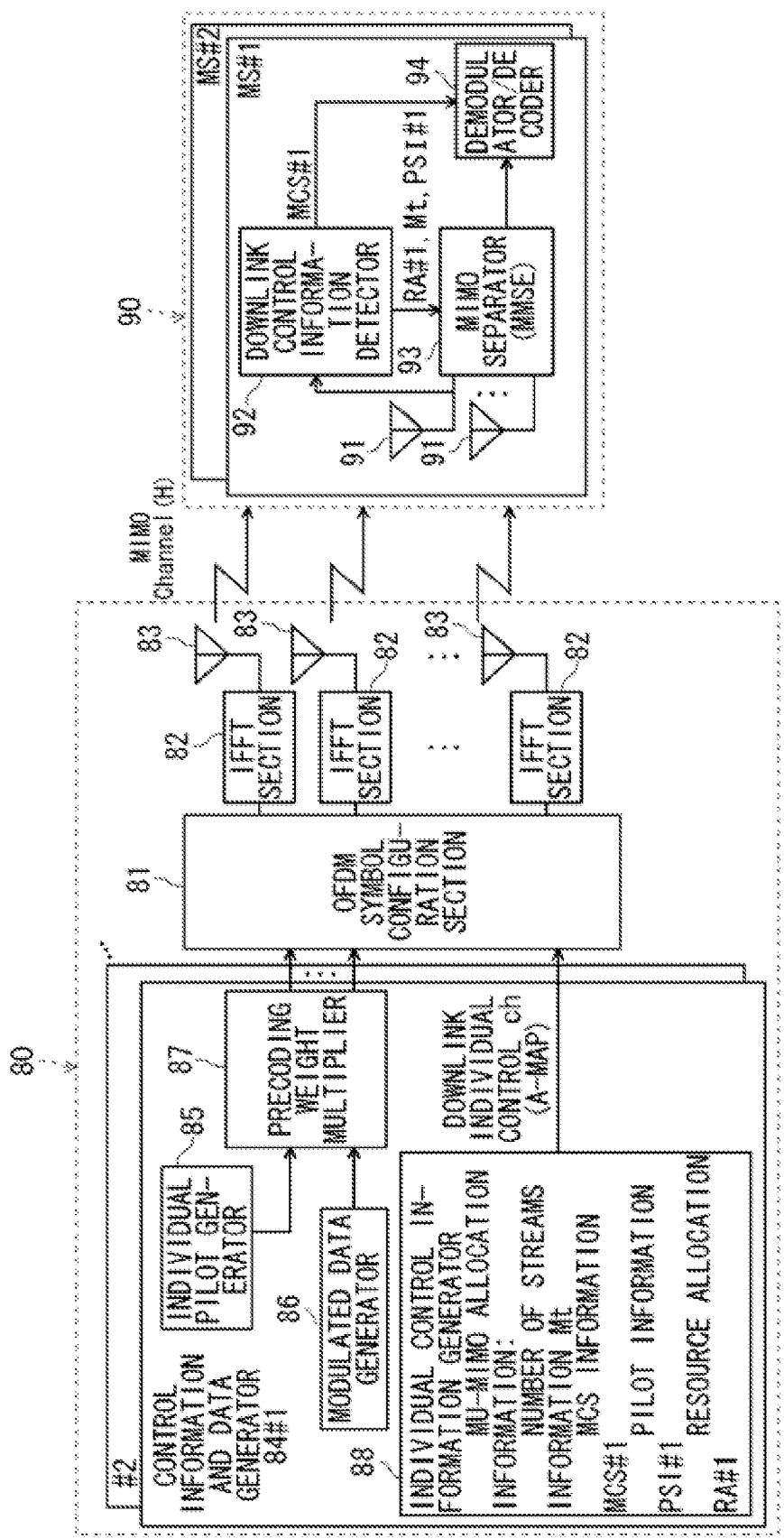
FIG. 23 is a block diagram illustrating configurations of a conventional base station device 80 and a conventional terminal device 90.
Figure 24:
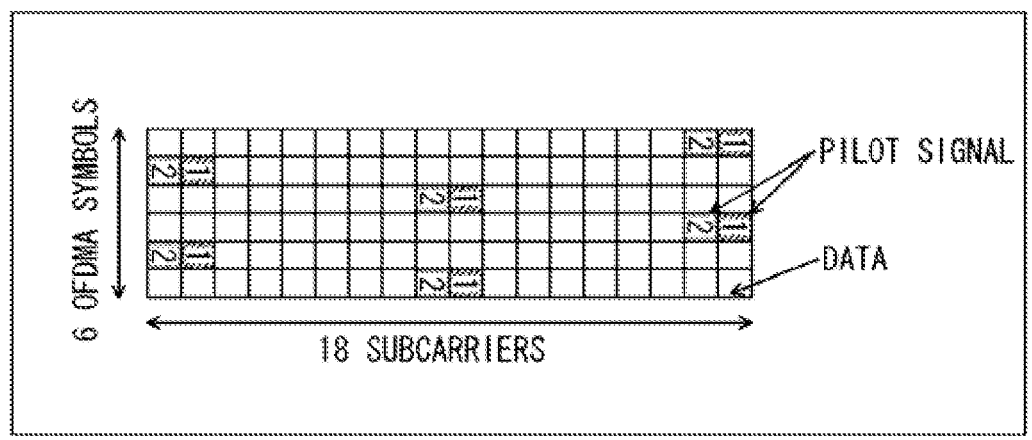
FIG. 24 is a diagram illustrating an example of a PRU configuration in a two-stream transmission mode.
Figure 25:
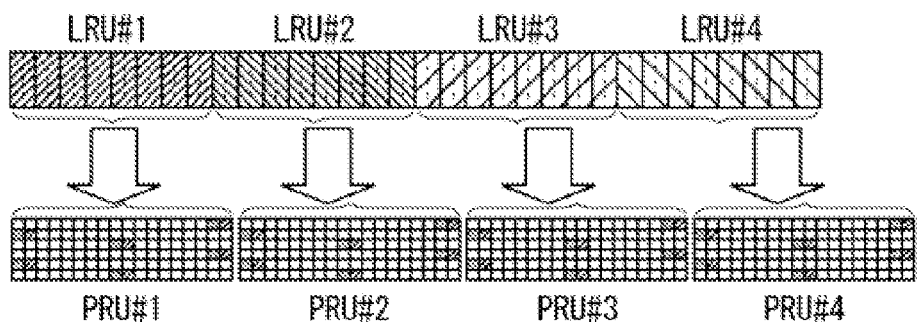
FIG. 25 is a diagram illustrating a continuous mapping according to one resource allocation method.
Figure 26:
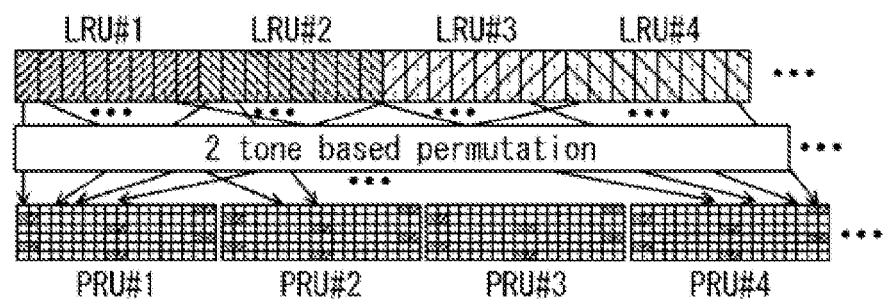
FIG. 26 is a diagram illustrating a distributed mapping according to another resource allocation method.

A description will be given of a configuration of the MIMO receiving processor 609A of the terminal device 600A with reference to FIG. 18. FIG. 18 is a block diagram illustrating the configuration of the MIMO receiving processor 609A. The MIMO receiving processor 609 illustrated in FIG. 18 includes an LRU basis symbol data converter 631, an MLD processor 632, a pilot symbol data part power measurer 636, a data area part received power measurer 637, a received power comparator 638, and a null data symbol area decider 639.

The pilot symbol data part power measurer 636 for each antenna measures an average received power of the data signal per each antenna on the LRU basis, and outputs the measurement result to the received power comparator 638.

The data area part received power measurer 637 for each antenna estimates an average received power per each antenna of the assumed pilot symbol from the channel estimate value on the LRU basis, and outputs the estimation result to the received power comparator 638.

The received power comparator 638 compares an output of the pilot symbol data part power measurer 636 for each antenna with an output of the data area part received power measurer 637 for each antenna on the LRU basis, and outputs the comparison result to the null data symbol area decider 639.

When a difference of the received power is a given value or more on the LRU basis, the null data symbol area decider 639 decides that the area is the null data area from the comparison result of the received power comparator 638, and outputs the decision result to the MLD processor 632.

The MLD processor 632 performs the MLD processing on the basis of the output result of the null data symbol area decider 639 on the LRU basis. That is, when the determination result of the null data symbol area decider 639 is not the null data area in the subject LRU, the MLD processor 632 performs the normal MLD processing. On the other hand, when the determination result of the null data symbol area decider 639 is the null data area in the LRU, the MLD processor 632 does not generate the replica of the data symbol of the spatial stream addressed to another station except for the stream addressed to the own terminal device, and sets the null data area as the null data. Then, the MLD processor 632 generates the symbol replica of the other spatial stream, and performs the MLD processing.

As described above, the terminal device 600A that is a modified example of the terminal device 600 according to the third embodiment adds the above-mentioned MLD processing to the normal MLD receiving process so as to apply the null data area used in the first embodiment or the second embodiment as it is.

First Modified Example of Base Station Device 500

In this example, in the base station device 500 according to the third embodiment, instead of the null data area used in the first embodiment or the second embodiment, there is used a transmitting method in which transmission using the repetition symbol data area is performed to enable an improvement in the reception quality even in the terminal device 600 that performs the MLD reception. However, the present invention is not limited to this configuration. As a modified example of the base station device 500, a base station device 500A notifies the individual control information to be transmitted to each terminal device of the information on the null data area in another spatial stream in the individual control signal generator 133 so as to apply the null data area used in the first embodiment or the second embodiment as it is.

Second Modified Example of Base Station Device 500

In this example, in the repetition symbol data area signal generator 503 of the base station device 500 according to the third embodiment, the known symbol data is generated and transmitted. However, the present invention is not limited to this configuration. For example, as a second modified example of the base station device 500, a base station device 500B may use the individual data of the terminal device using the repetition symbol data area instead of the known symbol data. The base station device 500B will be described below.

In this example, a difference of the base station device 500B from the base station device 500 of the third embodiment resides in that the repetition symbol data area signal generator 503 is replaced with a repetition symbol data area signal generator 503B. Only the configuration and operation thereof will be described, and the detailed description of the common configurations will be omitted.

The repetition symbol data area signal generator 503B generates a signal of the repetition symbol data area with the use of partial data of the terminal device MS#n on the basis of the information on the null data area RA_NULL#n for the terminal device MS#n (n=1 to S in this example).

That is, the repetition symbol data area signal generator 503B generates the signal of the repetition symbol data with the use of the symbol data included in the last LRU addressed to the terminal device MS#n using the same modulation system as that of the additional data area on the LRU basis as the symbol data of the LRU included in the null data area RA_NULL#n of the spatial stream #n addressed to the terminal device MS#n. Also, the repetition symbol data area signal generator 503B generates the normal pilot signal as the individual pilot symbol included in the repetition symbol data area.

Second Modified Example of Terminal Device 600

When the base station device 500B that is a second modified example of the base station device 500 according to the third embodiment is used as the base station device, the operation of the MIMO receiving processor 609 of the terminal device 600 illustrated in FIG. 16 is different. For that reason, a description will be given of the configuration and operation of an MIMO receiving processor 609B in a terminal device 600B as the second modified example of the terminal device 600. A difference of the terminal device 6008 from the terminal device 600 illustrated in FIG. 16 resides in that the MIMO receiving processor 609 is replaced with the MIMO receiving processor 609B, and the detailed description of the other common configurations will be omitted.

The terminal device 600B can improve the MLD reception quality during the MLD receiving process in the repetition symbol data area using the individual data of the terminal device.

A description will be given of a configuration of the MIMO receiving processor 609B in the terminal device 600B with reference to FIG. 19. FIG. 19 is a block diagram illustrating the configuration of the MIMO receiving processor 609B in the terminal device 600B. The MIMO receiving processor 609B illustrated in FIG. 19 includes an LRU basis symbol data converter 641, an MLD processor 642, an LRU basis hard decision value memory 643, a repetition symbol area matching-detector 644, a likelihood value updater 645, and a repetition symbol area decider 646.

The LRU basis symbol data converter 641 permutates data of the PRO basis into data of the LRU basis on the basis of the output data of the receivers 203 for each of the reception antennas 201, and outputs the data of the LRU basis to the MLD processor 642.

The MLD processor 642 performs the MLD processing on the basis of the channel matrix H that is the output from the channel estimator 207, the pilot sequence information PSI for the spatial stream addressed to the own terminal device or another terminal device, which is an output from the control information extractor 205, and the modulation information included in the MCS information. The MLD receiving process may use, for example, a technique disclosed in Non-patent Literature 4. Then, the MLD processor 642 outputs a soft decision value of the LRU basis of all the spatial streams to be subjected to the multiuser transmission to the decoder 211, the LRU basis hard decision value memory 643, and the repetition symbol area matching-detector 644.

The LRU basis hard decision value memory 643 converts the output of the soft decision value from the MLD processor 642 into the hard decision value, and temporarily stores the result.

The repetition symbol area matching-detector 644 converts the output of the soft decision value from the MLD processor 642 into the hard decision value for the subsequent LRU, and detects a consistency of the converted hard decision value and the hard decision value stored in the LRU basis hard decision value memory 643, which has a time delay on the LRU basis. Then, when the consistency is a given value or more, the repetition symbol area matching-detector 644 outputs the converted hard decision value as the soft decision value of the repetition symbol area to the likelihood value updater 645.

The likelihood value updater 645 updates the likelihood value of the spatial stream transmitted by plural times with the use of the repetition symbol area, and decides the symbol on the basis of the updated likelihood value.

When the repletion symbol area is included in the part (Yk) of the spatial streams (Y1, Y2, . . . , Ys), the MLD processor 642 generates a replica in which the symbol of Yk is decided at the time of generating the replica in the MLD processor 622 on the basis of the symbol decision result from the likelihood value updater, and performs the MLD processing for estimating the symbol of the remaining undecided spatial streams with the use of the maximum likelihood estimation standard.

As described above, the terminal device 600B that is the second modified example of the terminal device 600 according to the third embodiment can improve the MLD reception characteristic by reducing the number of reception candidates through the above-mentioned MLA receiving process.

Third Modified Example of Base Station Device 500

In this example, the repetition symbol data area signal generator 503 of the base station device 500 according to the third embodiment transmits the known symbol or the repetition symbol using a part of the user data to the repetition symbol area as described above. Then, the unit of the repetition symbol is set to the LRU basis, but the present invention is not limited to this configuration. For example, the unit of the repetition symbol may be set to a value smaller than the LRU unit.

In this example, the unit of the repetition symbol may be set to 1/N (N: natural number) of the LRU. In this case, even if the size of the repetition symbol area is 1 LRU, because the repetition symbol is transmitted by plural times (N times per LRU), the characteristic improvement is enabled in the repetition symbol area by the MLD receiving process based on the detection result together with the detection within 1 LRU. However, when N is too large, a length of the symbol that performs repetition becomes small, as a result of which when the symbol is not an original repetition symbol, there is a possibility that consistency erroneously occurs. That is, because there is a trade-off between the area detection precision and the reception characteristic improvement, there is a need to increase N to some degree. Taking this into account, N=3, 4, or 8 is effective. This is because the MLD reception that improves the reception quality can be applied to an area of half the LRU or more, and there are two or more timings of the match detection within one LRU.

FIG. 20 schematically illustrates a case of setting a repetitive symbol period with 1/N of the LRU as a unit in the two-user MU-MIN mode. The axis of ordinate in FIG. 20 represents an index of the spatial streams, and the axis of abscissa in FIG. 20 represents a resource index of the LRU basis. Also, blocks hatched in the figure represent the additional data area. Also, it is assumed that the terminal device MS#1 is the MLD reception compliant terminal device. As illustrated in FIG. 20, the repetition symbol area partitioned by the 1/N unit of the LRU is disposed on the back of the additional data area of the spatial stream #2, thereby enabling the characteristic improvement in the repetition symbol area.

In the description of the above respective embodiments, the antennas are applied. An antenna port is similarly applicable. The antenna port means a logical antenna configured by one or plural physical antennas. That is, the antenna port does not always mean one physical antenna, but may mean an array antenna configured by plural antennas. For example, in an LTE, the antenna port is not specified by the number of physical antennas configuring the antenna port, but specified as a minimum unit for allowing the base station to transmit different reference signals. Also, the antenna port may be specified as a minimum unit for multiplying a pecoding vector.

Also, the respective functional blocks used in the description of the above respective embodiments are typically realized as an LSI that is an integrated circuit. Each of those functional blocks may be integrated into one chip, or parts or all of those functional blocks may be integrated into one chip.

The LSI in this example may be called an IC, a system LSI, a super LSI, or an ultra LSI depending on a difference of integration.

Also, a technique of the integrated circuit is not limited to the LSI, but may be realized by a dedicated circuit or a general-purpose processor. There may be used an FPGA (field programmable gate array) that is programmable after manufacturing an LSI, or a reconfigurable processor that can reconfigure the connection or setting of a circuit cell within the LSI.

Further, if a technology for integration circuit which is substituted for the LSI appears due to the development of the semiconductor technology or another technology derived therefrom, the functional blocks may be integrated by that technology. A biotechnology may be applied.

The present invention has been described in detail and with reference to the specified embodiments. However, it would be apparent to one skilled in the art that the present invention could be variously modified or corrected without departing from the spirit and scope of the present invention.

The present invention is based on Japanese Patent Application No. 2009-173369 filed on Jul. 24, 2009, and content thereof is incorporated herein by reference.

INDUSTRIAL APPLICABILITY

The wireless communication device and the wireless communication method according to the present invention has such an advantage that a bias of the reception quality between the spatial streams can be suppressed, and is useful as the wireless communication device.

REFERENCE SIGNS LIST 100, 100A, 300, 500: base station device
101: antenna
103: receiver
105: feedback information extractor
107: terminal device allocator
109: resource allocation information extractor
111, 111A: additional data area setting section
113: null data area setting section
115: pilot sequence allocator
120, 120A: individual control signal and individual data signal generator
121: additional data generator
122: mode information/stream number information generator
123: resource allocation information generator
124: individual ID information generator
125: pilot sequence information generator
126: null data area signal generator
131: MCS information generator
133: individual control signal generator
135: encoder/modulator
137: individual pilot adder
139: precoding controller
141: beam-forming section
143: spatial stream power controller
151: OFDMA frame-forming section
153; IFFT section
155: transmitter
200, 600: terminal device
201: reception antenna
203: receiver
205: control information extractor
207: channel estimator
209, 609, 609A, 609B: MIMO receiving processor 211: decoder
213; precoding weight selector and reception quality estimator
215: feedback information generator
217: transmitter
219: transmission antenna
301: resource allocation method detector
302: pilot transmission controller
320: individual control signal and individual data signal generator
326: null data area signal generator
501: resource allocation method detector
502: data transmission controller
503: repetition symbol data area signal generator
520: individual control signal and individual data signal generator
621, 631, 641: LRU basis symbol data converter
622, 632, 642: MLD processor
623: repetition symbol area matching-detector
624: known symbol memory
625: repetition symbol area decider
636: pilot symbol data part power measurer
637: data area part received power measurer
638: received power comparator
639: null data symbol area decider
643: LRU basis hard decision value memory
644: repetition symbol area matching-detector
645: likelihood value updater
646: repetition symbol area decider

The invention claimed is:

1. A wireless communication device for performing a spatial multiplexing transmission using a plurality of streams, the wireless communication device comprising:
   a signal generator that allocates a pilot signal to a part of resource allocation areas to which no data addressed to a terminal device is allocated with pilot allocation patterns different between a continuous resource allocation method where a group of subcarriers that are contiguous is allocated and a distributed resource allocation method where a group of subcarriers that are distributed along a frequency axis is allocated, the resource allocation areas being within a resource unit that includes a plurality of resource elements with multiple OFDM symbols and multiple subcarriers, wherein the pilot allocation pattern defines which resource element among the plurality of resource elements is used to allocate the pilot signal; and
   a transmitter having a plurality of antenna ports that transmit the allocated pilot signal.

2. The wireless communication device according to claim 1, wherein
   the signal generator further allocates the pilot signal for which a transmission power is set based on the resource allocation method.

3. The wireless communication device according to claim 1, wherein
   the signal generator sets the transmission power of the pilot signal to zero when the resource allocation method is continuous mapping.

4. The wireless communication device according to claim 1, wherein
   the signal generator further sets the transmission power of the pilot signal to a non-zero value when the resource allocation method is distributed mapping.

5. The wireless communication device according to claim 1, wherein
   the part of resource allocation areas to which no data addressed to the terminal device is allocated is an area on a subband basis being configured by a plurality of physical resource units and continuously provided in a frequency domain.

6. The wireless communication device according to claim 1, further comprising:
   an additional data generator that allocates additional data to resource allocation areas to which no data addressed to the terminal device is allocated and to which no pilot signal is allocated among resource allocation areas for the spatial multiplexing transmission, wherein
   the transmitter transmits the allocated additional data and the allocated pilot signal.

7. The wireless communication device according to claim 6, wherein
   the additional data is one of repetition bit data and additional parity bit data.

8. The wireless communication device according to claim 6, further comprising:
   a repetition symbol data generator that allocates known repetition symbol data to be transmitted to the terminal device to resource allocation areas to which no data addressed to the terminal device is allocated and to which no additional data is allocated among the resource allocation areas for the spatial multiplexing transmission, wherein
   the transmitter transmits, the allocated additional data, the allocated pilot signal and the allocated known repetition symbol data.

9. A wireless communication method for performing a spatial multiplexing transmission using a plurality of streams, the wireless communication method comprising:
   allocating, by a signal generator, a pilot signal to a part of resource allocation areas to which no data addressed to a terminal device is allocated with pilot allocation patterns different between a continuous resource allocation method in which a group of subcarriers that are contiguous is allocated and a distributed resource allocation method in which a group of subcarriers that are distributed along a frequency axis is allocated, the resource allocation areas being within a resource unit that includes a plurality of resource elements with multiple OFDM symbols and multiple subcarriers, wherein the pilot allocation pattern defines which resource element among the plurality of resource elements is used to allocate the pilot signal; and
   transmitting the allocated pilot signal, by a plurality of antenna ports.

10. The wireless communication device according to claim 1, wherein
    in a pilot allocation pattern corresponding to the continuous resource allocation method, the pilot signal is not allocated to the part of resource allocation areas; and
    in a pilot allocation pattern corresponding to the distributed resource allocation method, the pilot signal is allocated to the part of resource allocation areas.

11. The wireless communication method according to claim 9 wherein
    in a pilot allocation pattern corresponding to the continuous resource allocation method, the pilot signal is not allocated to the part of resource allocation areas; and
    in a pilot allocation pattern corresponding to the distributed resource allocation method, the pilot signal is allocated to the part of resource allocation areas.

* * * * *